US012420294B2

(12) United States Patent
Matsushita

(10) Patent No.: US 12,420,294 B2
(45) Date of Patent: Sep. 23, 2025

(54) SHOWER HEAD

(71) Applicant: MTG Co., ltd., Nagoya (JP)

(72) Inventor: Tsuyoshi Matsushita, Nagoya (JP)

(73) Assignee: MTG CO., LTD., Nagoya (JP)

( * ) Notice: Subject to any disclaimer, the term of this patent is extended or adjusted under 35 U.S.C. 154(b) by 612 days.

(21) Appl. No.: 17/761,387

(22) PCT Filed: Aug. 20, 2020

(86) PCT No.: PCT/JP2020/031420

§ 371 (c)(1),
(2) Date: Mar. 17, 2022

(87) PCT Pub. No.: WO2021/065237

PCT Pub. Date: Apr. 8, 2021

(65) Prior Publication Data

US 2022/0371033 A1 Nov. 24, 2022

(30) Foreign Application Priority Data

Sep. 30, 2019 (JP) ................................ 2019-178635

(51) Int. Cl.
*B05B 1/34* (2006.01)
*A61H 33/02* (2006.01)
(Continued)

(52) U.S. Cl.
CPC ............... *B05B 1/34* (2013.01); *A61H 33/02* (2013.01); *B05B 1/18* (2013.01); *B05B 1/3405* (2013.01); *B05B 12/002* (2013.01); *B05B 1/1636* (2013.01)

(58) Field of Classification Search
CPC ........... B05B 1/34; B05B 1/18; B05B 1/3405; B05B 12/002; B05B 1/1636; A61H 33/02
See application file for complete search history.

(56) References Cited

U.S. PATENT DOCUMENTS

2015/0150813 A1 6/2015 Koboshi et al.

FOREIGN PATENT DOCUMENTS

CN 203459184 U 3/2014
GB 2524461 A * 9/2015 .............. B05B 1/18
(Continued)

OTHER PUBLICATIONS

Japanese Office Action for Japanese Application No. 2021-550416, dated Jun. 11, 2024, with an English translation.
(Continued)

*Primary Examiner* — Qingzhang Zhou
(74) *Attorney, Agent, or Firm* — Birch, Stewart, Kolasch & Birch, LLP

(57) ABSTRACT

A shower head includes a handle and a head portion. The head portion includes shower holes. The handle includes an upstream bubble generator that generates minute bubbles in water. The head portion includes a downstream bubble generator that generates minute bubbles in water in the same manner as the upstream bubble generator. The upstream bubble generator includes a constriction and a tapered portion. The downstream bubble generator has a swirling flow mode. Since minute bubbles are generated on the upstream and downstream sides, the amount of minute bubbles mixed in water becomes larger. This allows for showering by effectively using the function of minute bubbles.

9 Claims, 22 Drawing Sheets

(51) Int. Cl.

| | |
|---|---|
| ***B05B 1/18*** | (2006.01) |
| ***B05B 12/00*** | (2018.01) |
| *B05B 1/16* | (2006.01) |

(56) References Cited

FOREIGN PATENT DOCUMENTS

| | | | |
|---|---|---|---|
| JP | 2010-29649 | A | 2/2010 |
| JP | 5285794 | B1 | 9/2013 |
| JP | 2014-4317 | A | 1/2014 |
| JP | 5731650 | B2 | 6/2015 |
| JP | 2017-221919 | A | 12/2017 |
| JP | 2019-129926 | A | 8/2019 |

OTHER PUBLICATIONS

Chinese Office Action and Search Report for Chinese Application No. 202080064676.0, dated Oct. 27, 2023, with an English translation.

International Search Report, issued in PCT/JP2020/031420, PCT/ISA/210, dated Nov. 2, 2020.

Written Opinion of the International Searching Authority, issued in PCT/JP2020/031420, PCT/ISA/237, dated Nov. 2, 2020.

* cited by examiner

SHOWER HEAD

TECHNICAL FIELD

The present invention relates to a shower head that allows tap water (hereinafter referred to as water) released as shower water to contain minute bubbles (e.g., microbubbles).

BACKGROUND ART

Such a shower head is disclosed in Patent Literature 1 and Patent Literature 2. The shower head disclosed in Patent Literature 1 includes tapered through-holes in a passage that is located in the head at the distal end of the handle. When water passes through the through-holes, the gas dissolved into the water is generated as bubbles based on pressure changes.

In the shower head disclosed in Patent Literature 2, a tablet that generates bubbles when dissolved is arranged on the upstream side of a passage in the handle. Further, components that generate bubbles by self-priming air through a swirling flow of water is arranged on the downstream side.

CITATION LIST

Patent Literature

Patent Literature 1: Japanese Patent No. 5285794
Patent Document 2: Japanese Laid-Open Patent Publication No. 2014-4317

SUMMARY OF INVENTION

Problems that the Invention is to Solve

In the structure disclosed in Patent Literature 1, a bubble generator is disposed at only one position of a hot water passage proximate to the distal end of the shower head. This limits the amount of bubbles generated.

In the structure disclosed in Patent Literature 2, as described in the detailed description of the invention, the bubbles generated through dissolution of the tablet each have a large diameter (millimeters). Further, the Venturi effect is utilized in the components that generate bubbles by self-priming air. Thus, the ratio of air to the flow rate of water tends to high. This increases the diameter of each bubble as described above. Accordingly, generating the “fine particles of approximately several tens of μm” described in the detailed description of the invention is difficult unless the flow speed of water is greatly increased or the amount of air drawn in is properly adjusted.

It is an objective of the present invention to provide a shower head capable of generating a large amount of minute bubbles.

Solution to Problem

To achieve the above-described objective, the present invention provides a shower head that includes a handle and a head portion. The head portion includes shower holes. In the shower head, minute bubble generators are disposed at positions on an upstream side and a downstream side in a water passage. The minute bubble generators generate fine bubbles through cavitation.

In this structure, minute bubbles including fine bubbles are generated through cavitation in the bubble generators at the positions in the upstream side and the downstream side in the water passage. This increases the amount of minute bubbles generated. In addition, when water mixed with minute bubbles on the upstream side passes through the downstream bubble generator, the minute bubbles are further atomized so that the total number of minute bubbles increases. This allows water containing a large amount of minute bubbles to be released as shower water and provides showering by effectively using the properties of minute bubbles.

Fine bubbles refer to bubbles each having a diameter of 100 μm or smaller and are collective terms of microbubbles and ultra-fine bubbles. In the embodiment, minute bubbles refer to bubbles including fine bubbles. A microbubble has a diameter of 1 to 100 μm. An ultra-fine bubble has a diameter of less than 1 μm. Water containing microbubbles becomes white and is thus visually recognizable, whereas water containing ultra-fine bubbles does not become white and is transparent.

Advantageous Effects of Invention

The present invention is an excellent shower head that allows shower water to contain a large amount of minute bubbles.

DESCRIPTION OF EMBODIMENTS

First Embodiment

A first embodiment of the present invention will now be described with reference to FIGS. 1 to 20.

Entire Structure of Shower Head

Figure 1:
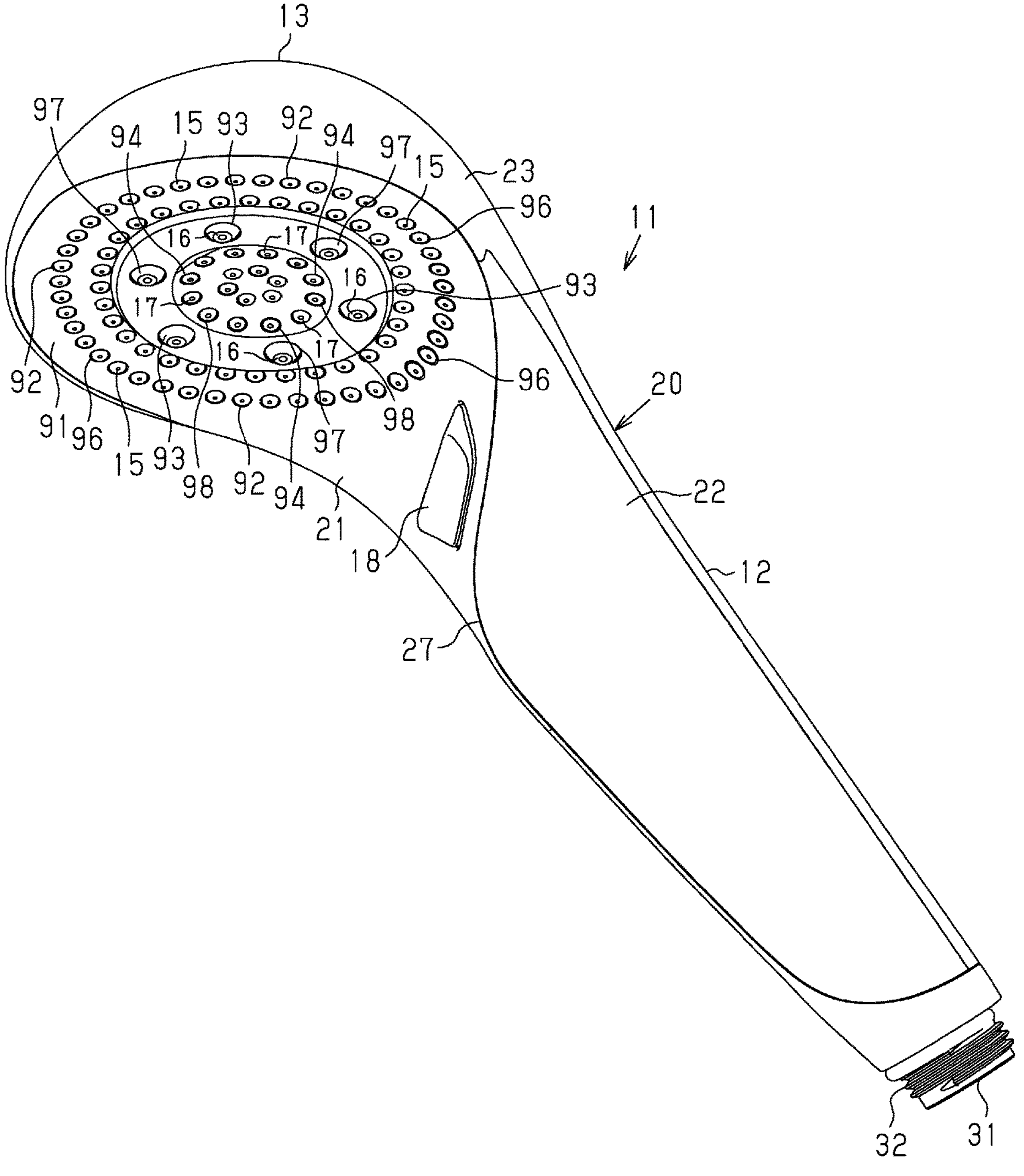
FIG. 1 is a perspective view of a shower head according to a first embodiment as viewed from the front side of the shower head.
Figure 3:
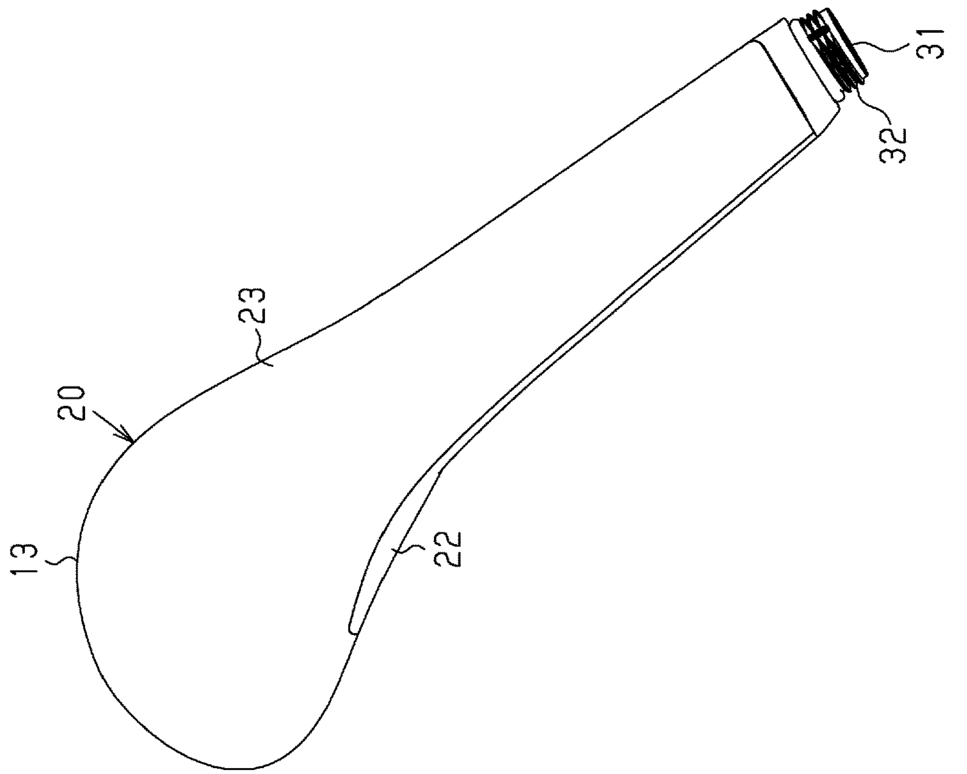
FIG. 3 is a perspective view showing the shower head of FIG. 1 as viewed from the rear side.
Figure 2:
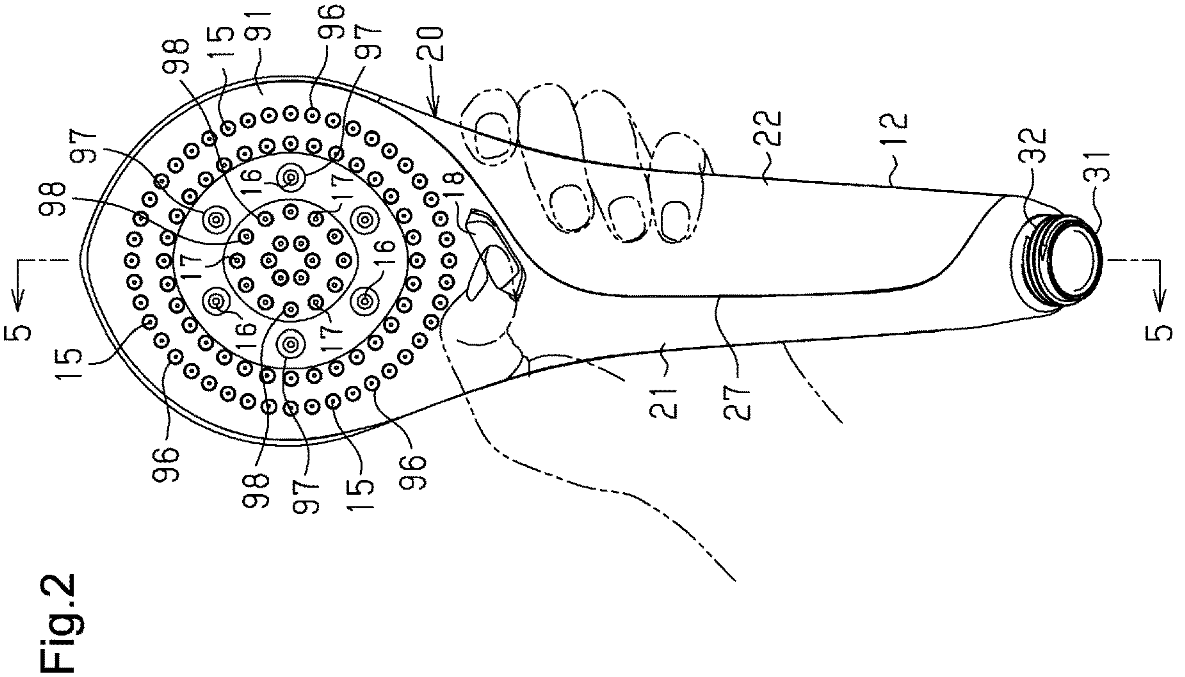
FIG. 2 is a front view showing the shower head of FIG. 1.

As shown in FIGS. 1 to 3, a shower head 11 of the first embodiment includes a handle 12 and a head portion 13. The handle 12 is held by a user. The head portion 13 is located proximate to the distal end of the handle 12. The handle 12 includes an upstream passage unit 14 (refer to FIGS. 4 and 5) of a water passage. Cold water, hot water, or mixed water (cold and hot water) from a water supply hose (not shown) connected to the shower head 11 is supplied to the upstream passage unit 14. When the water flows through the water passage, the water becomes shower water and is then released from shower holes 15, 16, 17 that are located at the distal end of the head portion 13. In the first embodiment, the water passage through which water flows in the shower head 11 is defined by the upstream passage unit 14, an intermediate passage unit 41 (described below), and a water distribution unit 100 (described below).

In the first embodiment, shower water with normal pressure (normal shower) is released from the shower holes 15 arranged in two annular regions on the outer circumferential side. Low-pressure misted shower (mist shower) water is released from the large-diameter shower holes 16 arranged in one annular region on the inner circumferential side. High-pressure shower (jet shower) water is released from the shower holes 17 arranged in two annular regions at the central portion. The shower holes 15 on the outer circumferential side are referred to as normal shower holes 15, the shower holes 16 on the inner circumferential side are referred to as mist shower holes 16, and the shower holes 17 at the central portion are referred to as jet shower holes 17.

As shown in FIGS. 1 and 2, the front surface of the upper end of the handle 12 includes a switch button 18. As viewed from the front surface of the shower head 11, the switch button 18 is shifted rightward from the central position in the left-right direction. Thus, as shown in FIG. 2, the switch button 18 is located such that the switch button 18 can be easily pushed with the thumb of the left hand that holds the handle 12. Each time the switch button 18 is pushed to perform switch operation, the following first to fourth shower types are sequentially selected to switch the shower type.

In the first shower mode, normal shower water and jet shower water are simultaneously released. In the second shower mode, only jet shower water is released. In the third shower mode, only mist shower water is released. In the fourth shower mode, mist shower water and normal shower water are simultaneously released. In the first embodiment, minute bubbles including microbubbles and ultra-fine bubbles are mixed in the water of each shower. Particularly, a large amount of minute bubbles is mixed in mist shower water, and mist shower water contains a large amount of microbubbles and ultra-fine bubbles.

The structure of each component will now be described in detail.

Structure of Shell

As shown in FIGS. 1 to 3, a shell 20 of the shower head 11 includes a first front cover 21, a second front cover 22, and a back cover 23. These covers 21 to 23 are coupled to each other by, for example, tabs 24 (refer to FIG. 4). The first front cover 21 and the second front cover 22 define the front surface of the shower head 11. The back cover 23 defines the rear surface of the shower head 11. The surfaces of the second front cover 22 and the back cover 23 are plated with metal (e.g., chrome). The first front cover 21 is made of a transparent material. The rear surface of the first front cover 21 includes a pattern such as recesses and projections (not shown) extending in the up-down direction. The rear surface of the first front cover 21 is plated with metal (e.g., chrome). The transparent material and the metal plating make the first front cover 21 transparent and lustrous. The metal-plated rear surface of the first front cover 21 may further be color-plated or color-coated such that the plating has a deeper color. Additionally, the durability of the metal plating may be increased.

As shown in FIGS. 1 and 2, the contact portion of the first front cover 21 and the second front cover 22 on the front side defines a ridgeline 27. The ridgeline 27 extends in the up-down direction on the front surface of the handle 12 and is continuous from the handle 12 to the outer circumference of the head portion 13. The ridgeline 27 is slightly shifted leftward at the handle 12 as viewed from the front.

Structure of Upstream Section of Water Passage

Figure 4:
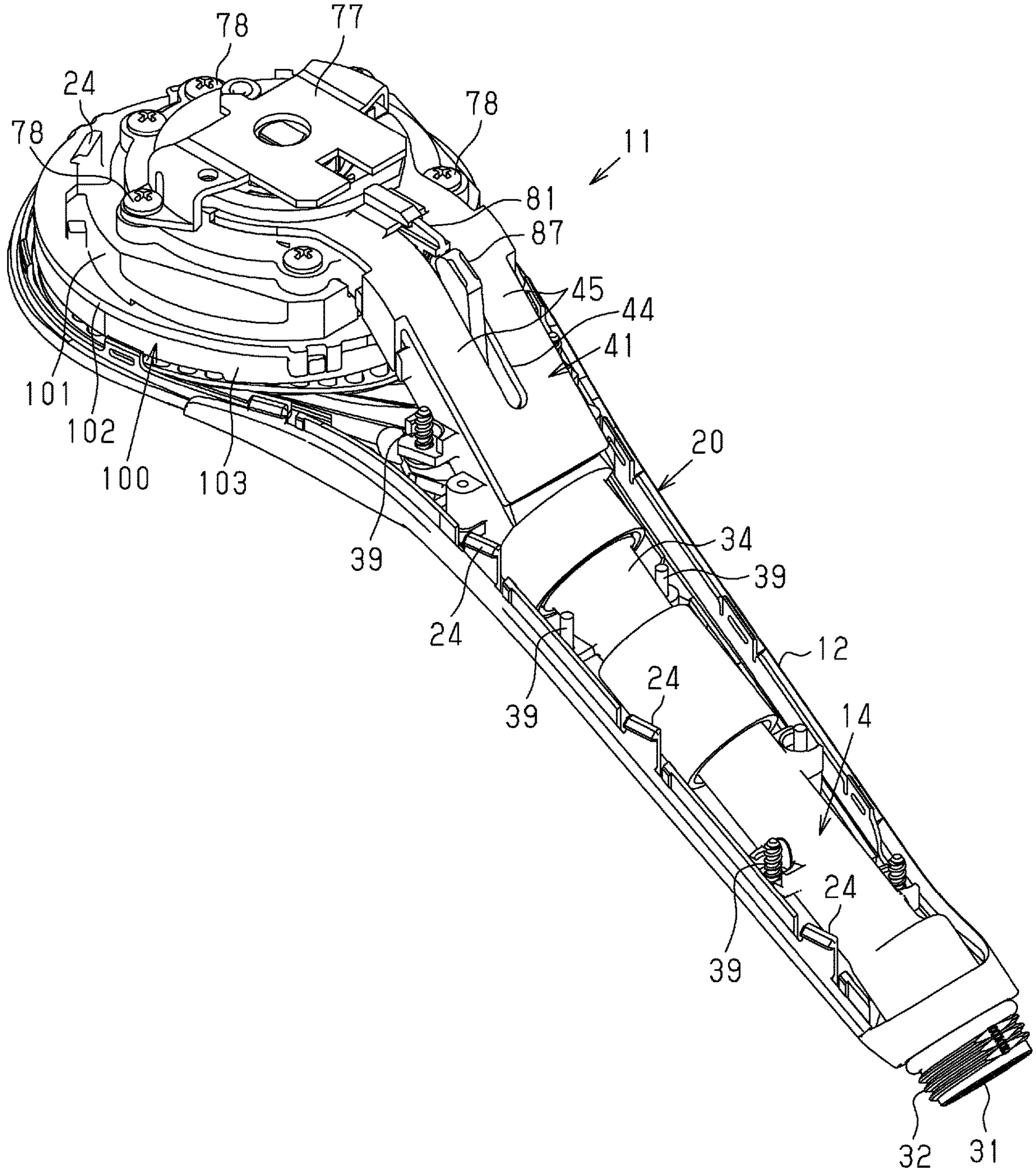
FIG. 4 is a perspective view showing the shower head of FIG. 1 with its back cover off.
Figure 5:
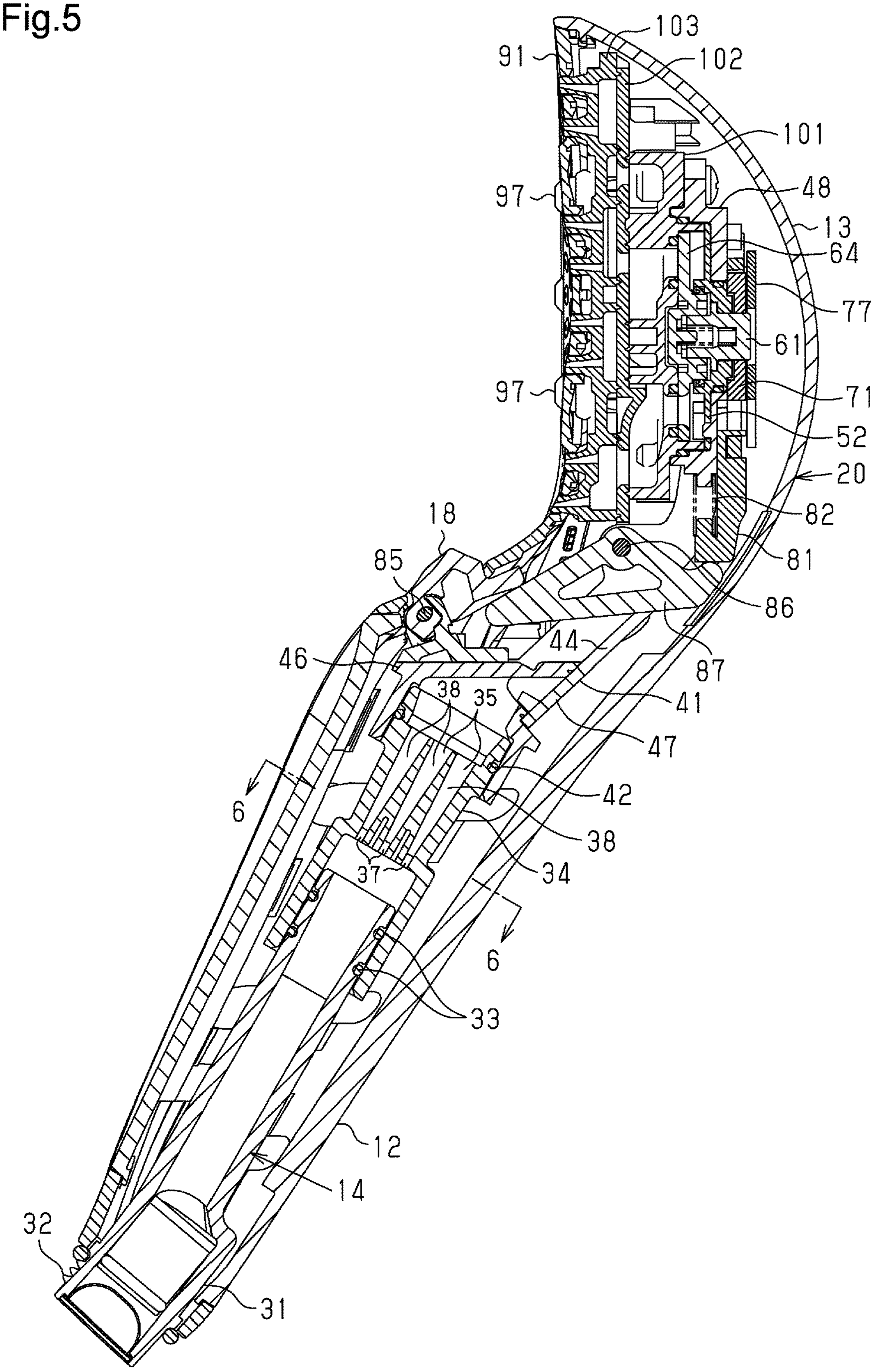
FIG. 5 is a cross-sectional view taken along line 5-5 in FIG. 2.

As shown in FIGS. 4 and 5, the upstream passage unit 14 is arranged in the handle 12 of the shell 20. A connection hose 31 protrudes from the handle 12 to define the upstream side of the upstream passage unit 14. The protrusion includes a screw 32 used to connect the water supply hose (not shown).

Figure 6:
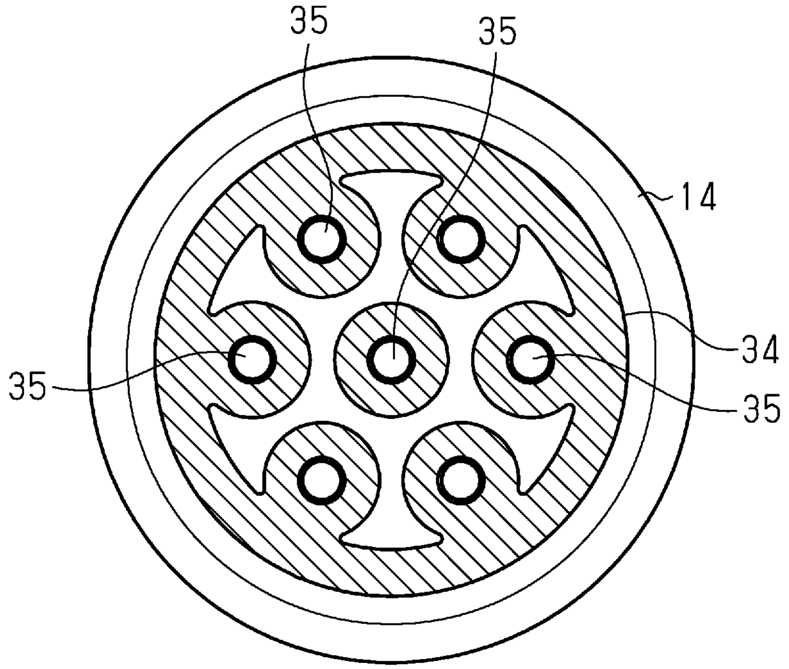
FIG. 6 is a cross-sectional view taken along line 6-6 in FIG. 5.

As shown in FIGS. 5 and 6, a bubble generating member 34 is connected to the downstream side of the connection hose 31 by seal rings 33. The bubble generating member 34 defines the downstream side of the upstream passage unit 14. The entire bubble generating member 34 is cylindrical. Tubular bubble generating passages 35 are arranged in the bubble generating member 34 at equal intervals at the central position and the annular region of the bubble generating member 34. Each bubble generating passage 35 is located on a corresponding one of central axes parallel to each other. The first embodiment includes seven bubble generating passages. A constriction 37 having a narrowed cross-sectional flow area is disposed upstream of each bubble generating passage 35. A tapered portion 38 widened toward the downstream side is disposed downstream of each constriction 37. When water passes through the constrictions 37 and then moves to the tapered portions 38, cavitation is caused by pressure differences in the water. This generates minute bubbles including microbubbles and ultra-fine bubbles in the water. The bubble generating member 34 serves as an upstream bubble generator that generates minute bubbles in a straight passage mode with the constrictions 37 so as to utilize the Venturi effect.

The number of the bubble generating passages 35 may be one or more. The number of the bubble generating passages 35 is preferably five to nine or is more preferably seven because of the pressure of general tap water and a proper amount of minute bubbles.

The upstream passage unit 14 is fixed to the back cover 23 using screws 39, which are shown in FIG. 4.

Structure of Midstream Section and Downstream Section of Water Passage

Figure 16:
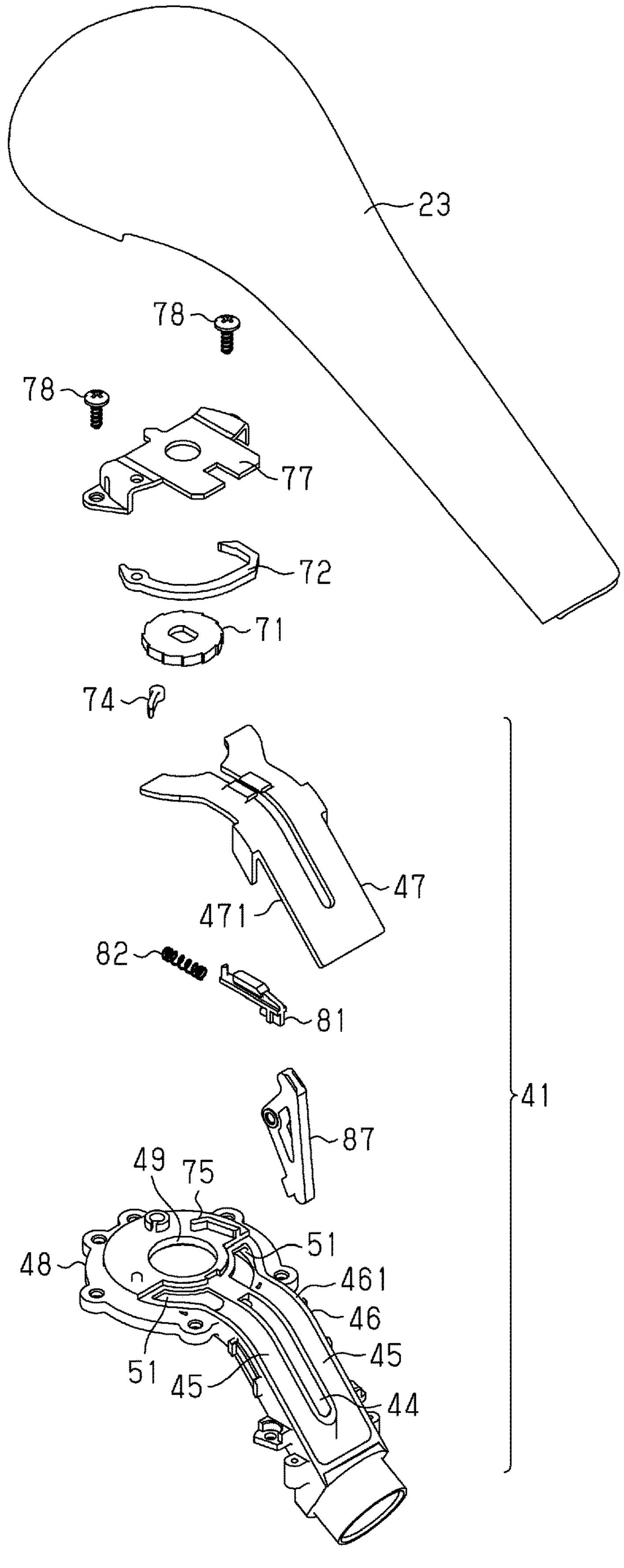
FIG. 16 is an exploded perspective view showing a part of the head portion of the shower head according to the first embodiment.
Figure 19:
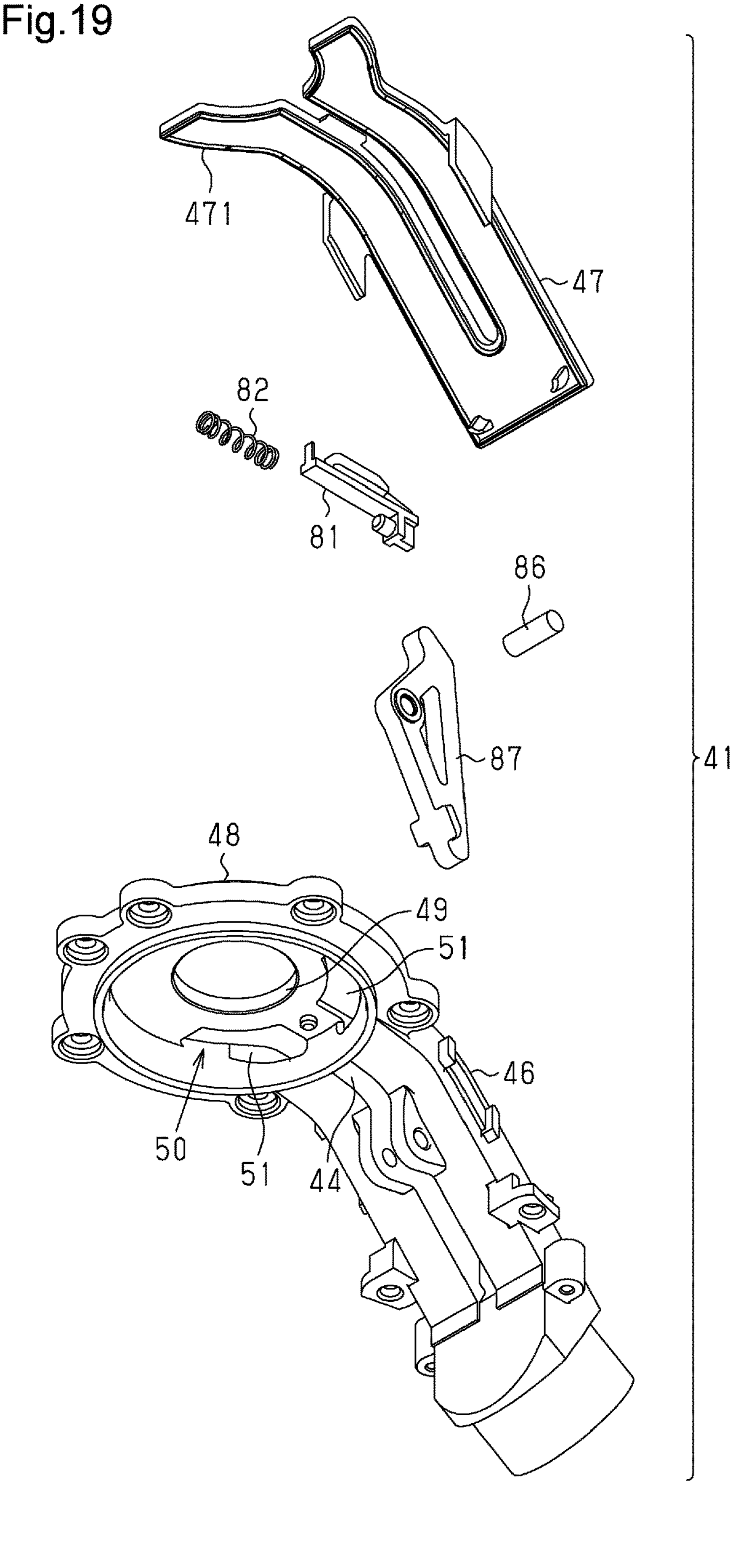
FIG. 19 is an exploded perspective view showing the intermediate passage unit portion.

As shown in FIGS. 4 and 5, the intermediate passage unit 41 is connected to the downstream side of the bubble generating member 34 (upstream bubble generator) by a seal ring 42. The middle portion of the intermediate passage unit 41 in the width direction includes a slit 44. As shown in FIGS. 4, 16, and 19, the intermediate passage unit 41 includes an intermediate passage body 46 with branched passages 45 for water on the opposite sides of the slit 44. The intermediate passage unit 41 also includes a lid 47 welded to the intermediate passage body 46 through vibration so as to cover the upper surfaces of the branched passages 45. Thus, the branched passages 45 are arranged in a bifurcated manner by the slit 44. A substantially circular support 48 is disposed integrally with the distal end of the intermediate passage body 46. A support hole 49 extends through the central portion of the support 48. The lower surface of the support 48 includes an accommodation chamber 50. The ends of the intermediate passage body 46 and the lid 47 that are proximate to the support 48 are gently curved in a side view. The accommodation chamber 50 is connected to the branched passages 45 through openings 51. Thus, the water from the branched passages 45 is supplied from the openings 51 to the accommodation chamber 50 and merge in the accommodation chamber 50.

Figure 7:
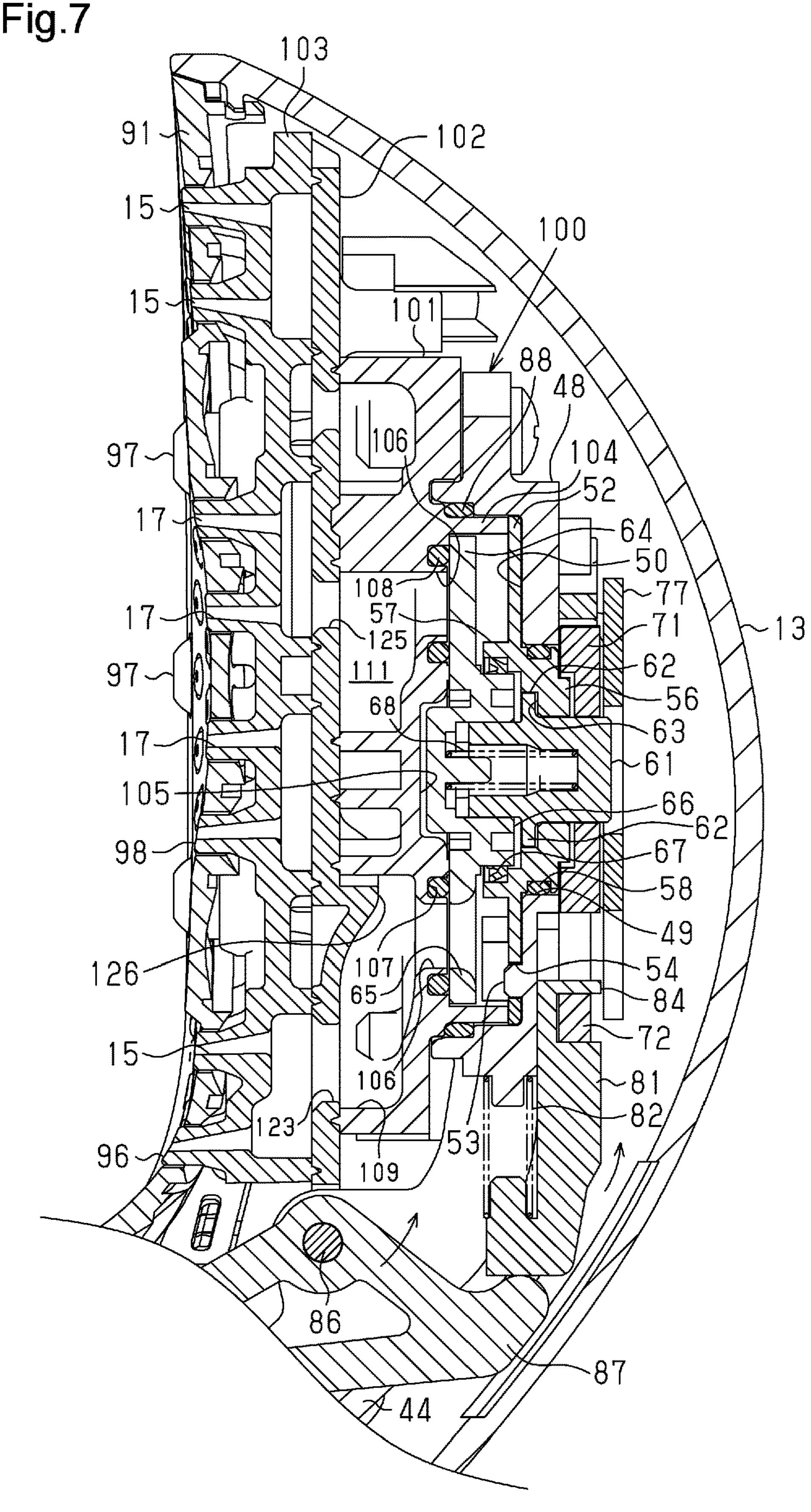
FIG. 7 is an enlarged cross-section showing a part of the head portion of the shower head of FIG. 5.
Figure 17:
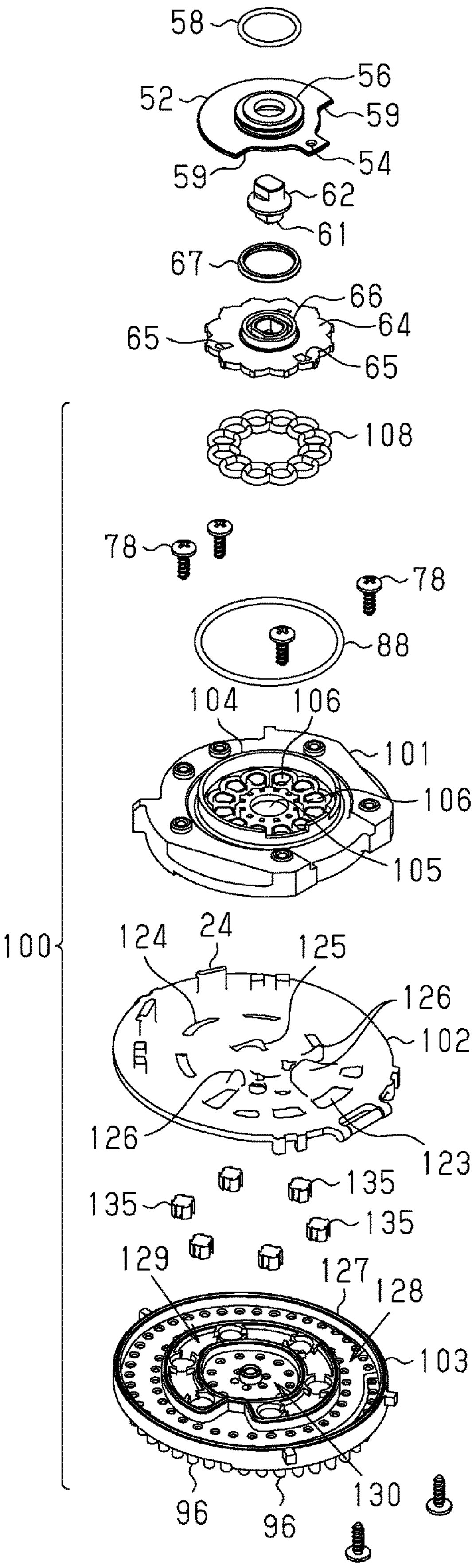
FIG. 17 is an exploded perspective view showing the water distribution unit from above.

The upstream passage unit 14 is fixed to the back cover 23 using screws 39, which are shown in FIG. 4. As shown in FIGS. 7 and 17, a pressure receiving plate 52, which is made of metal (e.g., brass), is in close contact with the inner upper surface of the accommodation chamber 50 and positioned by a pin 53 and a hole 54. A small-diameter boss 56 and a large-diameter boss 57 are disposed integrally with the upper and lower surfaces of the pressure receiving plate 52, respectively. The upper boss 56 is supported on the inner circumferential surface of the support hole 49 by a seal ring 58 in a watertight manner. The pressure receiving plate 52 includes a notch 59 that corresponds to each opening 51. The pressure receiving plate 52 has toughness resistant to the inner pressure of the accommodation chamber 50. The toughness prevents the support 48 from being deformed by the inner pressure of the accommodation chamber 50.

Structure for Switching Passage

As shown in FIGS. 7 and 17, the upper part of a support shaft 61, which has a D-cut surface, is rotationally supported in the upper boss 56 of the pressure receiving plate 52. The support shaft 61 includes a flange 62 that is fitted to a gap 63 of the boss 56 of the pressure receiving plate 52. In the same manner as the upper part of the support shaft 61 in the accommodation chamber 50, the lower part of the support shaft 61 includes a D-cut surface to which a switch plate 64 is attached. The switch plate 64 is rotated integrally with the support shaft 61. A lip seal 67 is disposed between the outer circumferential surface of a boss 66 on the upper surface of the switch plate 64 and the inner circumferential surface of the boss 57 at the lower part of the pressure receiving plate 52. Three switch ports 65 extend through the switch plate 64 at equal intervals. Water in the accommodation chamber 50 passes through the switch ports 65. The switch plate 64 is biased downward toward a seal ring 108 (described later) by a coil spring 68 that is located between the switch plate 64 and the support shaft 61.

Figure 8:
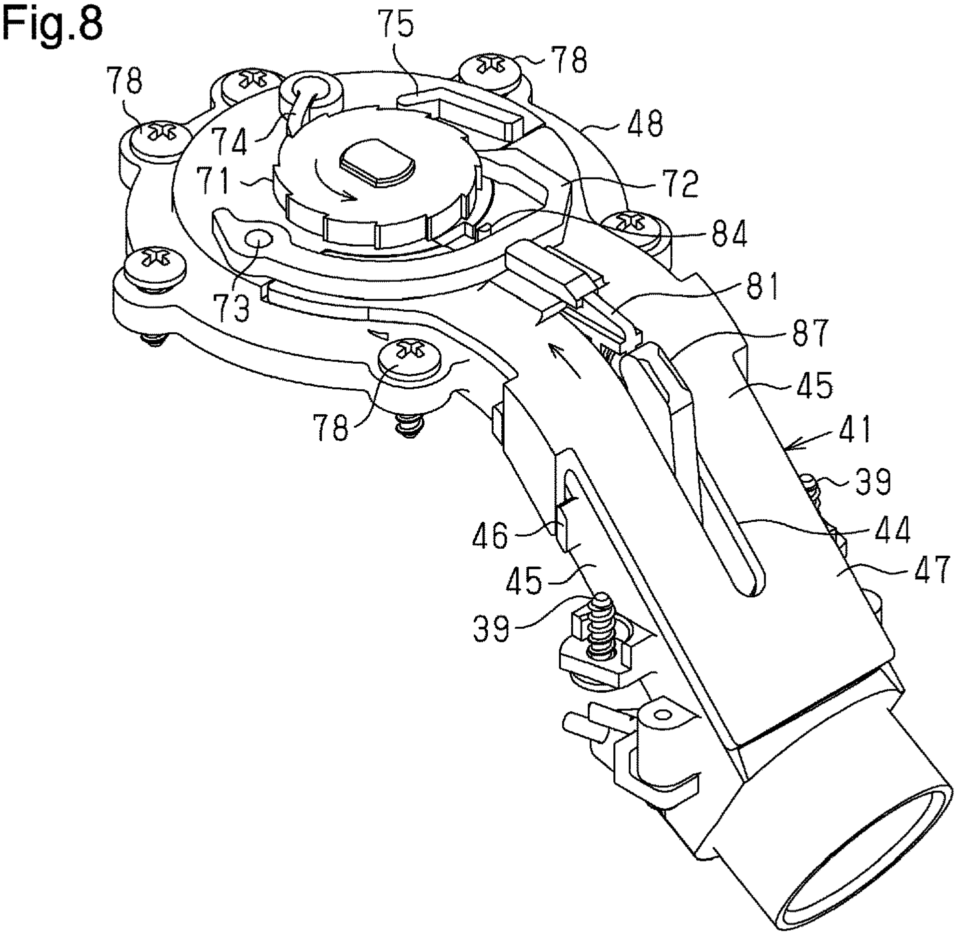
FIG. 8 is a perspective view showing a downstream passage unit.

As shown in FIGS. 7, 8, and 16, a ratchet wheel 71 is supported at the upper part of the support shaft 61 on the upper surface of the support 48 of the intermediate passage unit 41 such that the ratchet wheel 71 is rotatable integrally with the support shaft 61. Thus, as the ratchet wheel 71 rotates, the switch plate 64 rotates integrally with the support shaft 61. A feeding pawl 72 is rotationally supported by a shaft 73 on the upper surface of the support 48. When the feeding pawl 72 pivots about the shaft 73 in the counterclockwise direction, as shown in FIG. 8, the feeding pawl 72 is deformed to engage a tooth of the ratchet wheel 71. The engagement causes feed-rotation of the ratchet wheel 71 by a predetermined angle in the counterclockwise direction as shown by the arrow in FIG. 8 in the same manner.

A restriction pawl 74 is attached to the upper surface of the support 48. The restriction pawl 74 constantly engages a tooth of the ratchet wheel 71. When the feeding pawl 72 rotates the ratchet wheel 71, the restriction pawl 74 is deformed against its elasticity and moved back by the tooth of the ratchet wheel 71, thereby permitting the ratchet wheel 71 to rotate. In contrast, the engagement of the restriction pawl 74 with the tooth restricts the ratchet wheel 71 from rotating in the clockwise direction in FIG. 8, which is opposite to the counterclockwise direction. The upper surface of the support 48 includes a wall 75. The wall 75 restricts the feeding pawl 72 from being excessively deformed away from the ratchet wheel 71.

As shown in FIG. 4, a metal retainer 77 is attached to the support 48 using screws 78. The retainer 77 restricts separation of the ratchet wheel 71, feeding pawl 72, and restriction pawl 74 from the support 48.

As shown in FIGS. 7, 8, and 16, a sliding member 81 is disposed below the feeding pawl 72. The sliding member 81 is supported on the upper surface of the support 48 of the intermediate passage unit 41 such that the sliding member 81 is slidable in the direction shown by the arrow in FIG. 8 and in its opposite direction. The sliding member 81 is biased by a coil spring 82 in the direction opposite to the arrow direction. As shown in FIGS. 7 and 8, a part of the feeding pawl 72 is latched by a latch 84 at the distal end of the sliding member 81. As the sliding member 81 moves in the arrow direction and its opposite direction, the feeding pawl 72 pivots about the shaft 73.

As shown in FIG. 5, the switch button 18 is pivotally supported by a shaft 85 inserted through the intermediate passage body 46. As shown in FIGS. 5 and 19, a transmission lever 87 is pivotally supported by a shaft 86 on the lower surface of the intermediate passage body 46. The transmission lever 87 is located in the slit 44, which forms the bifurcated branched passages. In other words, the transmission lever 87 is located in a narrow section of the bifurcated portion. The biasing force of the coil spring 82 causes the sliding member 81 to contact one end of the transmission lever 87 and causes the switch button 18 to contact the other end of the transmission lever 87. Further, the biasing force of the coil spring 82 causes the switch button 18 to protrude from the first front cover 21. The switch button 18, sliding member 81, coil spring 82, and transmission lever 87 form a shower type switch mechanism.

In a normal state shown in FIGS. 5 and 7, the biasing force of the coil spring 82 moves the sliding member 81 backward. Thus, the feeding pawl 72 is spaced apart from the ratchet wheel 71, and the switch button 18 is located at a protruding position where the switch button 18 can be pushed down by the transmission lever 87. In this state, when the switch button 18 is pushed down against the biasing force of the coil spring 82, the sliding member 81 is moved forward by the transmission lever 87. This pivots the feeding pawl 72 toward the ratchet wheel 71 and rotates the ratchet wheel 71 by a predetermined angle in the counter-clockwise direction shown by the arrow in FIG. 8. As a result, the switch plate 64 rotates by one pitch. In the first embodiment, the rotation angle of the ratchet wheel 71 and the switch plate 64 corresponding to one pitch is thirty degrees. The rotation of the ratchet wheel 71 by one pitch sequentially moves the switch plate 64 to the positions (described later) of first to fourth shower modes.

Water Distribution Unit and Related Components

Figure 18:
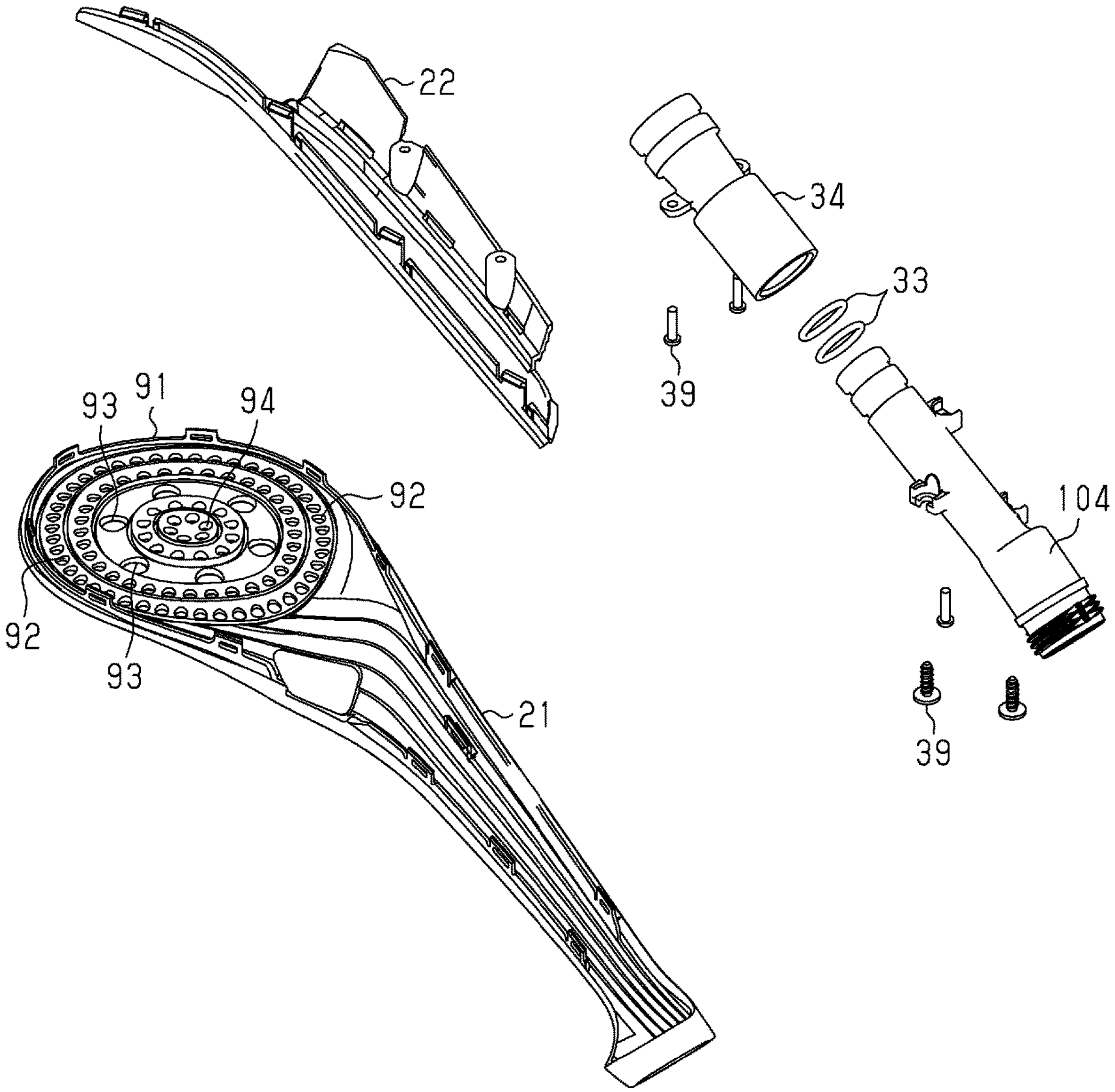
FIG. 18 is an exploded perspective view showing a part of the handle of the shower head according to the first embodiment.

As shown in FIGS. 1, 2, and 18, the upper end of the front surface of the first front cover 21 includes a face plate 91. First through-holes 92 extend through two annular regions of the outer circumferential portion of the face plate 91 that are concentric to each other. Second through-holes 93 extend through one annular region concentric to the two annular regions of the first through-hole 92 on the inner circumferential side. Third through-holes 94 extend through the central portion of the face plate 91 in two annular regions concentric to these annular regions.

Figure 9:
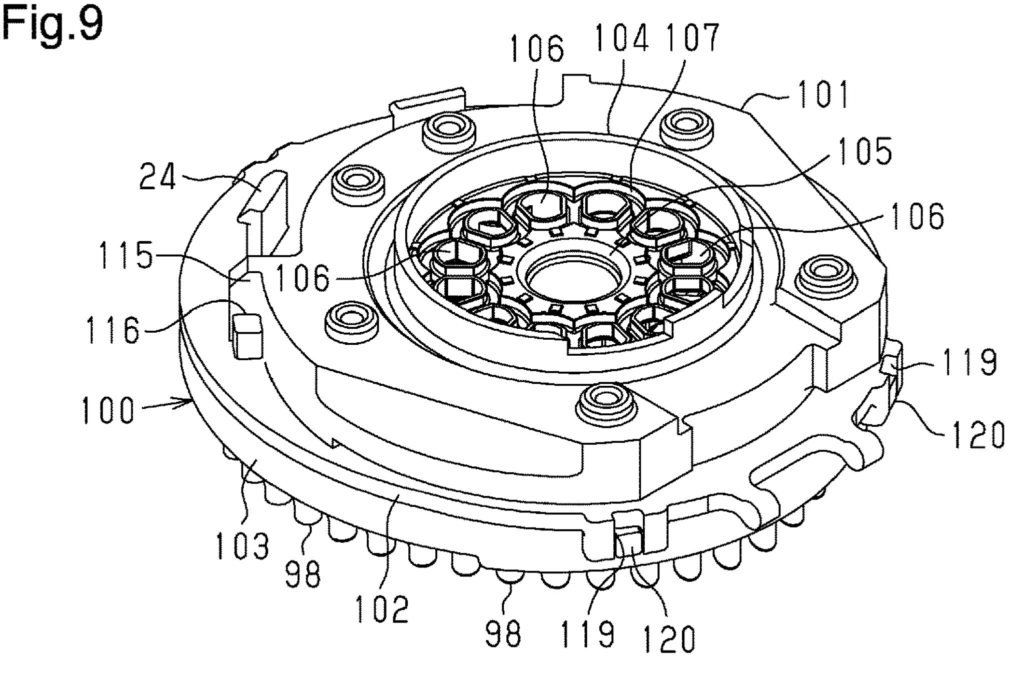
FIG. 9 is a perspective view showing the water distribution unit.

As shown in FIGS. 7 to 9, the water distribution unit 100 is located between the face plate 91 and the support 48 of the intermediate passage unit 41 and fixed to the support 48 using the screws 78. The water distribution unit 100 includes a first member 101, a second member 102, and a third member 103 in this order from the upstream side of the water passage.

As shown in FIGS. 7, 9, and 17, the upper surface of the first member 101 includes a cylindrical portion 104. The cylindrical portion 104 is fitted into the support hole 49 by a seal ring 88. The switch plate 64 is located in the cylindrical portion 104. The upper surface of the first member 101 includes a central recess 105. Multiple (twelve in the first embodiment) selection holes 106 extend through the surrounding portion of the central recess 105 at equal intervals. The number of the selection holes 106 is equal to that of the teeth of the ratchet wheel 71. A fitting groove 107 is disposed around each selection hole 106. The fitting grooves 107 are rings that are continuous with each other. A seal ring 108 is fitted to the fitting grooves 107 to seal the space between the first member 101 and the switch plate 64. As is obvious from FIG. 10, each time the switch plate 64 is rotated by one pitch, the switch port 65 of the switch plate 64 sequentially connects to a different selection hole 106 so that the water from the switch port 65 passes through the selection hole 106.

Figure 10:
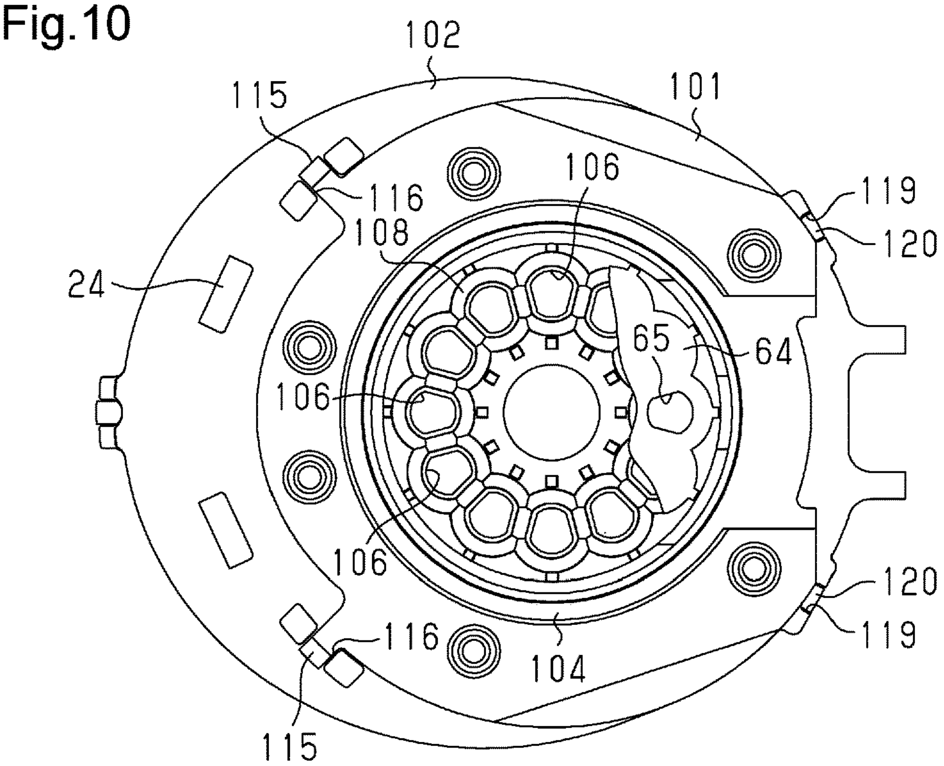
FIG. 10 is a plan view showing the water distribution unit.

As shown in FIGS. 9 and 10, the first member 101 and the second member 102 are positioned through engagement of protrusions 115 and recesses 116 with each other at two positions on the outer circumferential side of the first member 101 and the second member 102. The second member 102 and the third member 103 are positioned through engagement of protrusions 119 and recesses 120 with each other at two positions. The first member 101 is welded to the second member 102 and the second member 102 is welded to the third member 103 through vibration on joint faces where they are in direct contact with each other. This makes the spaces between the members 101 to 103 watertight.

Figure 11:
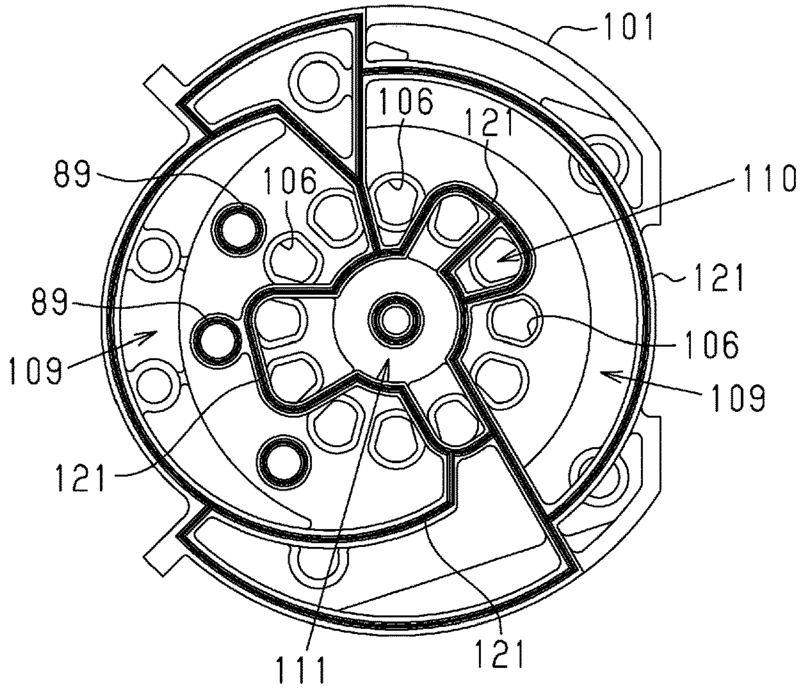
FIG. 11 is a bottom view showing the first member of the water distribution unit.

As shown in FIGS. 7, 9, and 11, partition walls 121 are disposed at positions on the outer and inner circumferential sides of the lower surface of the first member 101. The partition walls 121 are joined to the upper surface of the second member 102. The partition walls 121 define a normal shower chamber 109, a mist shower chamber 110, and a jet shower chamber 111 in the lower surface of the first member 101. One or more of the selection holes 106 open in these chambers 109 to 111. As described above, the shower mode is switched and set to the first to fourth shower modes depending on the rotation position of the switch plate 64. The switching of the shower mode connects the switch ports 65 of the switch plate 64 to one or two of the normal shower chamber 109, the mist shower chamber 110, and the jet shower chamber 111 through the selection holes 106. That is, in the first shower mode, the switch ports 65 are connected to the normal shower chamber 109 and the jet shower chamber 111. In the second shower mode, the switch ports 65 are connected to the jet shower chamber 111. In the third shower mode, the switch ports 65 are connected to the mist shower chamber 110. In the fourth shower mode, the switch ports 65 are connected to the normal shower chamber 109 and the mist shower chamber 110.

Accordingly, in the first shower mode, the water from the switch ports 65 and the selection holes 106 are supplied to the normal shower chamber 109 and the jet shower chamber 111. In the second shower mode, the water is supplied to only the jet shower chamber 111. In the third shower mode, the water is supplied to only the mist shower chamber 110. In the fourth shower mode, the water is supplied to the normal shower chamber 109 and the mist shower chamber 110.

Figure 12:
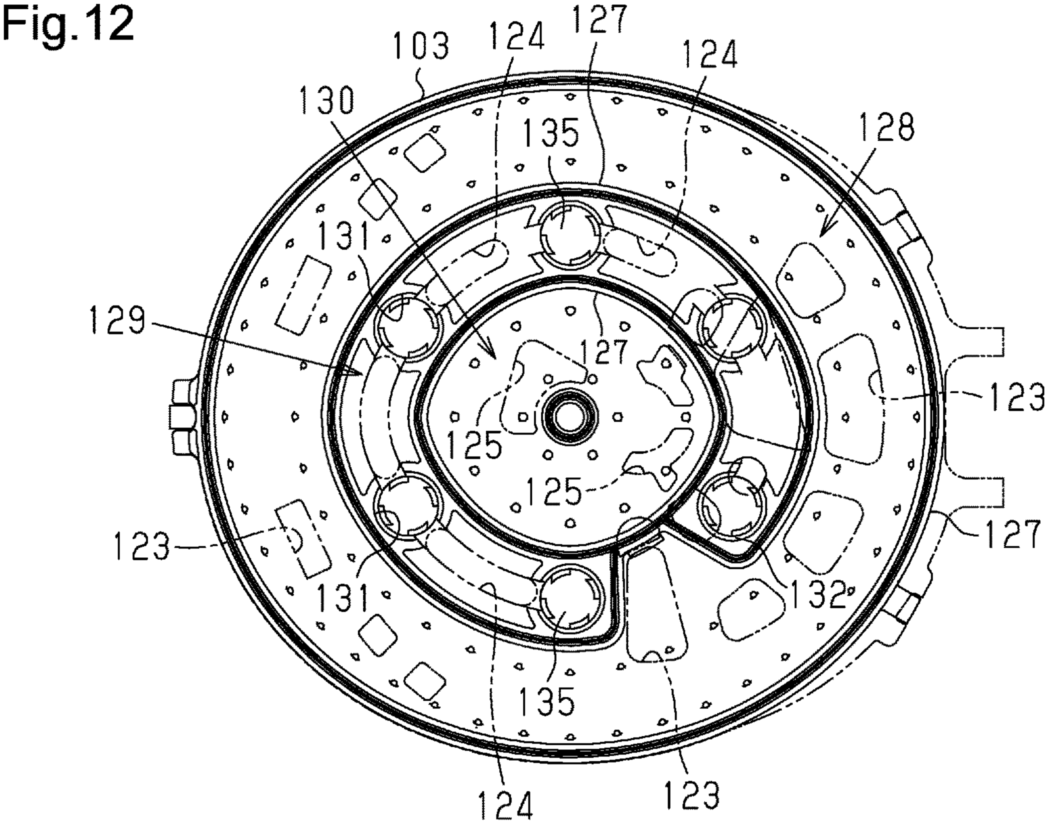
FIG. 12 is a plan view showing the third member of the water distribution unit.
Figure 13:
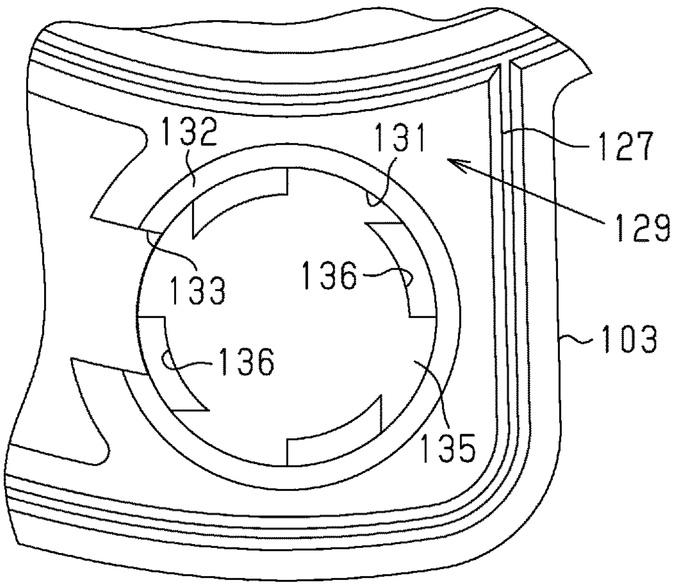
FIG. 13 is an enlarged plan view showing a part of the third member of the water distribution unit.
Figure 20:
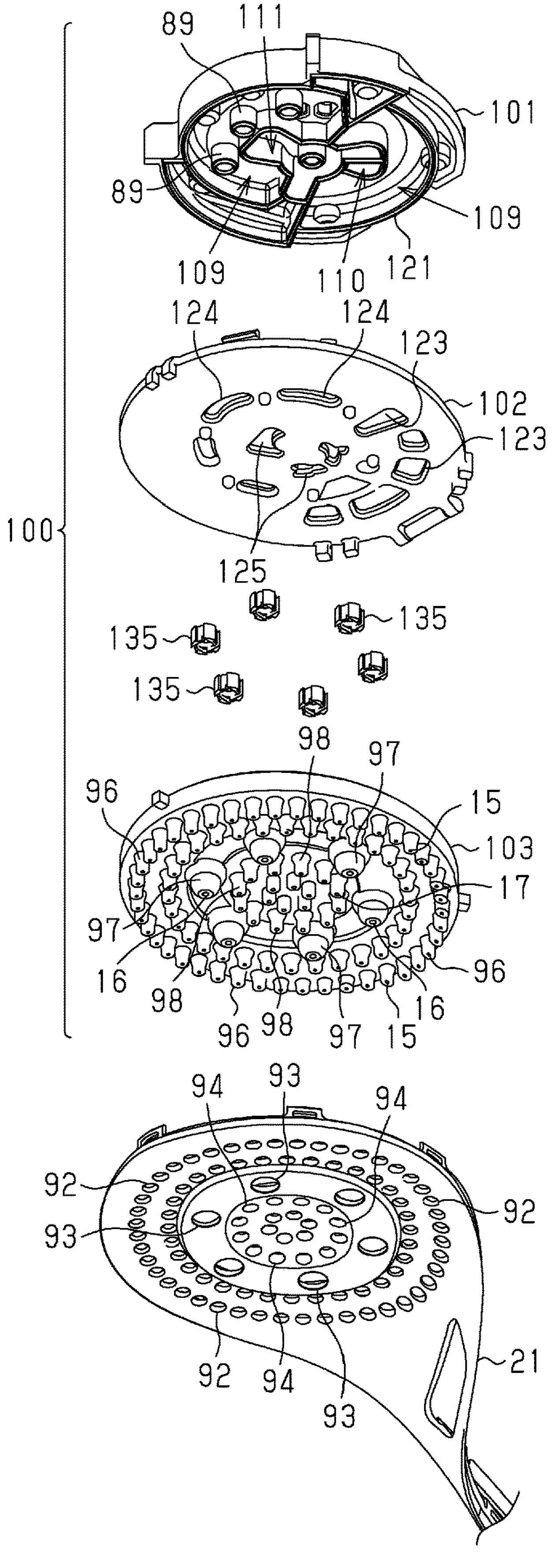
FIG. 20 is an exploded perspective view showing the water distribution unit from below.

As shown in FIGS. 12, 17, and 20, connection holes 123 to 125 are extended through the second member 102 and opposed to the normal shower chamber 109, the jet shower chamber 111, and the mist shower chamber 110, respectively. The water from the chambers 109 to 111 pass through the connection holes 123 to 125. Some of the connection holes 123 extend over the normal shower chamber 109 and the mist shower chamber 110. As shown in FIGS. 7 and 17, the upper surface of the second member 102 in the vicinity of the connection holes 123 opposed to the normal shower chamber 109 includes guide protrusions 126 in contact with the inner surfaces of the partition walls 121. The guide protrusions 126 guide water to the connection holes 123, 125. As shown in FIGS. 4 and 17, the upper surface of the second member 102 includes the tab 24, which engages the water distribution unit 100 with the back cover 23.

As shown in FIGS. 11 and 20, the lower surface of the first member 101 includes holding protrusions 89. The holding protrusions 89 receive the second member 102 and prevent the second member 102 from being deformed by water pressure.

As shown in FIGS. 12 and 17, partition walls 127 are disposed on the central portion of the third member 103 and its outer circumferential side. The partition walls 127 define a normal shower passage 128 on the outer circumferential side, a mist shower passage 129 on its inner side, and a jet shower passage 130 at the central portion. As shown in FIGS. 12 and 20, the normal shower passage 128 is connected to the normal shower chamber 109 of the second member 102 through the connection holes 123. The mist shower passage 129 is connected to the mist shower chamber 110 of the second member 102 through one connection hole 123 and one connection hole 124. The jet shower passage 130 is connected to the jet shower chamber 111 of the second member 102 through the connection holes 125.

As shown in FIGS. 7 and 20, the front surface of the third member 103 includes protrusions 96 to 98 that open the normal shower holes 15, the mist shower holes 16, and the jet shower holes 17, respectively. The protrusions 96 to 98 are exposed to the front side of the first to third through holes 92 to 94, which extend through the face plate 91. The normal shower holes 15 are connected to the normal shower passage 128. The mist shower holes 16 are connected to the mist shower passage 129. The jet shower holes 17 are connected to the jet shower passage 130. The normal shower holes 15, the mist shower holes 16, and the jet shower holes 17 are each oriented outward at a small inclined angle. Thus, shower water is released slightly outward. The shower water is released to the annular regions that conform to the arrangement shapes of the first to third through-holes 92, 93, 94.

Figure 14:
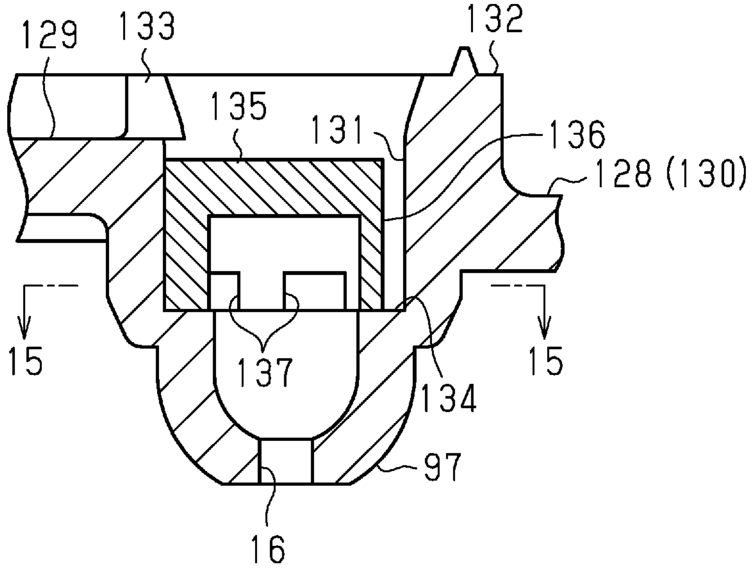
FIG. 14 is a vertical cross-sectional view showing the downstream bubble generator.
Figure 15:
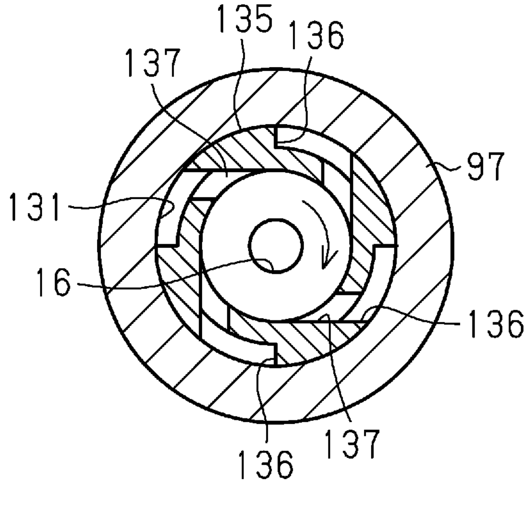
FIG. 15 is a cross-sectional view taken along line 15-15 in FIG. 14.

As shown in FIG. 14, the bottom of the mist shower passage 129 is located higher than the bottoms of the other passages 128, 130. As shown in FIG. 12, the bottom of the mist shower passage 129 includes accommodation recesses 131 at equal intervals. As shown in FIG. 15, the mist shower hole 16 extends through the bottom of each accommodation recess 131. Further, the opening of the upper part of the accommodation recess 131 includes a guide wall 132 at the same height as the partition wall 127. The guide wall 132 includes a passage 133.

As shown in FIGS. 14 to 16, the accommodation recess 131 includes a step 134. The step 134 accommodates a swirling flow generating member 135 at a position lower than the bottom of the mist shower passage 129. The swirling flow generating member 135 includes a lid and is tubular. Drawing grooves 136 are disposed on the outer circumference of the swirling flow generating member 135. The lower end of each drawing groove 136 includes a guide opening 137. Each guide opening 137 is connected to the internal space of the swirling flow generating member 135 and opens in a tangential direction. The water that has flowed into the accommodation recess 131 passes through the drawing grooves 136 and then flows into the swirling flow generating member 135 as high-speed swirling flow. Thus, cavitation occurs so as to generate minute bubbles including microfine bubbles and ultra-fine bubbles in the water. Accordingly, the accommodation recess 131 and the swirling flow generating member 135 form a lower bubble generator of a swirling flow mode.

Operation of Shower Head

The operation of the shower head 11 will now be described.

When the switch button 18 is operated, the ratchet wheel 71 is rotated by the feeding pawl 72 via the transmission lever 87 and the sliding member 81. The rotation of the ratchet wheel 71 connects the switch port 65 of the switch plate 64 to the selection holes 106 of the normal shower chamber 109 and the jet shower chamber 111 when the switch plate 64 is located at the position for the first shower mode. Thus, water reaches the normal shower chamber 109 and the jet shower chamber 111 and passes through the connection holes 123, 125 to the normal shower passage 128 and the jet shower passage 130. Then, the water is simultaneously released as normal shower water and jet shower water from the normal shower holes 15 and the jet shower holes 17.

Accordingly, the simultaneous release of normal shower water and jet shower water allows hair to be efficiently washed and allows water to be efficiently stored in a bathtub. In this state, minute bubbles containing microbubbles and ultra-fine bubbles are mixed in shower water by the upstream bubble generator (bubble generating member 34). This allows for showering utilizing the effects of minute bubbles and allows minute bubbles to be mixed in water stored in the bathtub.

When the switch button 18 is pushed to rotate the ratchet wheel 71 so that the switch plate 64 is pivoted to the position of the second shower mode, the rotation of the switch plate 64 causes the switch port 65 to oppose another selection hole 106. This releases only jet shower water from the jet shower holes 17 through the jet shower chamber 111, the connection holes 125, and the jet shower passage 130. Accordingly, shower water containing microbubbles and ultra-fine bubbles can be used to wash hair or store water in a bathtub as described above.

Further, when the switch button 18 is operated so as to move the switch plate 64 to the position for the third shower mode, the switch port 65 opposes another selection hole 106. This causes the water containing minute bubbles generated in the upstream bubble generator to reach the mist shower chamber 110 and the mist shower passage 129. Then, the water is supplied to the space between the inner surface of the accommodation recess 131 and the swirling flow generating member 135, which correspond to the downstream bubble generator. Next, the water is swirled at high speed in the swirling flow generating member 135, and fine bubbles are mixed in the water. This causes only mist shower water including a large amount of fine bubbles to be water released from the mist shower holes 16. Accordingly, showering can be performed by effectively using a large amount of minute bubbles.

Furthermore, when the switch button 18 is operated so as to move the switch plate 64 to the position for the fourth shower mode, the switch port 65 opposes another selection hole 106. This causes water to reach the normal shower chamber 109 and the mist shower chamber 110. The water is released as normal shower water and mist shower water from the normal shower holes 15 and the mist shower holes 16 through the normal shower passage 128 and the mist shower passage 129. Thus, the normal shower water mixed with minute bubbles in the upstream bubble generator and the mist shower water mixed with minute bubbles in the downstream bubble generator are simultaneously released. These showers can be used to, for example, wash a user's face and/or hair, store water in a bathtub.

Shower water was released by a shower head of an example having the structure of the first embodiment and a shower head of a comparative example having a conventional structure, with the same conditions of water pressure, water temperature, water quality, and the like, to measure the amount of ultra-fine bubbles generated. The shower head of the example was set to the third shower mode of releasing only mist shower water. In the shower head of the comparative example, a bubble generator of a straight passage mode including the constrictions 37 was disposed in the head portion, and a bubble generator was arranged in one section, not in multiple sections.

One milliliter of the water released from these shower heads was stored in a transparent container. Immediately after the storage, the amount of ultra-fine bubbles was measured using a fine bubble measurement method conducted by Fine Bubble Industries Association. The measurement device used was NanoSight (registered trademark) NS300, made by Malvern Panalytical Ltd in the United Kingdom. The measurement result was as follows.

29,300,000 ultra-fine bubbles were measured in the water released from the shower head of the example. 4,100,000 ultra-fine bubbles were measured in the water released from the shower head of the comparative example.

The measurable minimum unit of the measurement device is 100,000. The result indicates that the amount of ultra-fine bubbles generated by the shower head of the example was seven times larger than the amount of ultra-fine bubbles generated by the shower head of the comparative example.

The first embodiment has the following advantages.

(1) By switching the switch button 18, the user can select the first shower mode of releasing normal shower water and jet shower water, the second shower mode of releasing only jet shower water, the third shower mode of releasing only mist shower water, or the fourth shower mode of simultaneously releasing normal shower water and mist shower water. Thus, by switching the switch button 18, the user can easily select four types of shower shower modes and select a requested showering. Further, water mixed with minute bubbles is gained through released shower water.

(2) Minute bubbles are generated through cavitation in the upstream bubble generator and the downstream bubble generator. Thus, minute bubbles containing a large amount of microbubbles and ultra-fine bubbles are efficiently contained in water. This provides a cleaning effect and a temperature keeping effect using minute bubbles for showering and bathing in a bathtub. In particular, ultra-fine bubbles do not significantly disappear over a long time period (e.g., ten hours or more). Thus, when shower water is used as bathtub water, ultra-fine bubbles maintain the bathtub water producing the above-described effects over a long time period.

(3) In the third shower mode of releasing only mist shower water and the fourth shower mode of simultaneously releasing mist shower water and normal shower water, minute bubbles are mixed in water in the upstream bubble generator. Then, fine bubbles are further mixed in the water in the downstream bubble generator. As a result, a large amount of fine bubbles is mixed in mist shower water. This provides shower water containing a large amount of fine bubbles including microbubbles and ultra-fine bubbles and a large amount of minute bubbles, each having a large diameter as described above.

(4) When water mixed with minute bubbles in the upstream bubble generator passes through the downstream bubble generator, the minute bubbles are further atomized so that the number of minute ultra-fine bubbles increases. As a result, the total number of minute bubbles increases. This provides shower water and bathtub water in which bubbles do not significantly disappear and the functions of minute bubbles are improved.

(5) The upstream bubble generator generates bubbles in a straight passage continuous from the constrictions 37 to the tapered portions 38, so as to utilize the Venturi effect. Thus, the upstream bubble generator is arranged in the handle 12 in the longitudinal direction of the handle 12. Accordingly, even if the upstream bubble generator is incorporated in the handle 12, the handle 12 is prevented from becoming thick. This makes the shower head 11 easier to handle and improves the design of the shower head 11.

(6) The downstream bubble generator generates bubbles in a swirling passage (mist water passage). Thus, the thickness of the head portion 13 is reduced in the direction in which mist water is released. This reduces the thickness of the head portion 13 and reduces the shower head 11 in size and weight, thereby making the shower head 11 easier to use and improving the design of the shower head 11.

(7) The content and diameters of minute bubbles in shower water can be adjusted when necessary by replacing the upstream bubble generator with an upstream bubble generator that has a different number of bubble generating passages 35.

(8) The transmission lever 87 (switch mechanism) is disposed in the narrow section of the bifurcated portion of the intermediate passage unit 41. This allows the switch mechanism to be efficiently incorporated in the intermediate passage unit 41 and reduces the size of the shower head 11.

(9) The ridgeline 27 of the handle 12 is shifted toward one side. This allows the switch button 18 to be arranged in a wider area below the face plate 91, which includes the shower holes 15 to 17. The switch button 18 can be arranged in this area with few constraints. This allows the switch button 18 to be easily operated and accordingly makes the shower head 11 easier to use.

Second Embodiment

A second embodiment of the present invention will now be described with reference to FIGS. 21 to 25. The differences from the first embodiment will mainly be described.

Figure 21:
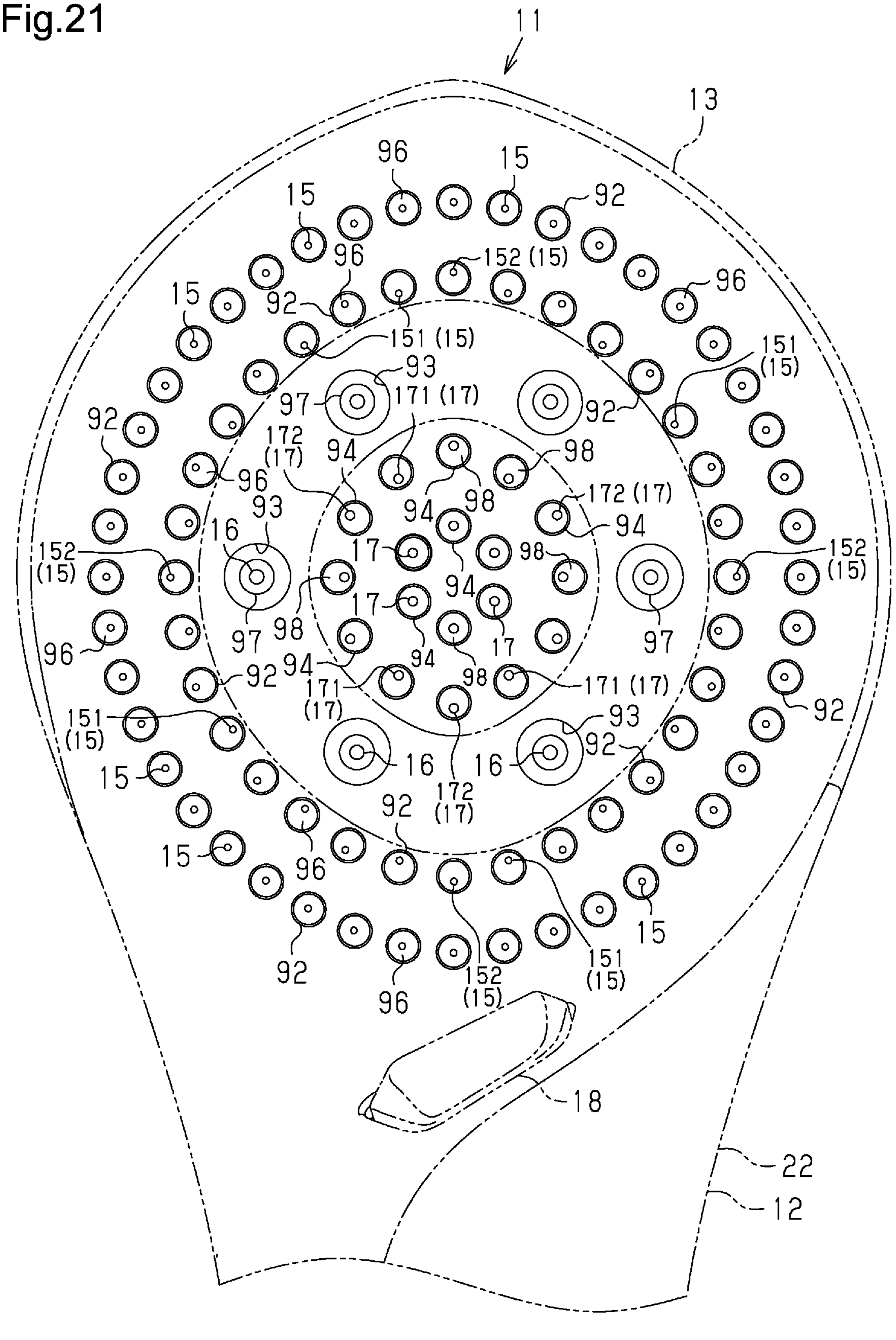
FIG. 21 is a front view showing a part of the shower head according to a second embodiment.

As shown in FIG. 21, in the second embodiment, the normal shower holes 15 are arranged in two annular regions, namely, in an inner annular region and an outer annular region. The normal shower holes 15 in the inner annular region include normal shower holes 151 each located at every other position and normal shower holes 152 located at the remaining positions. The normal shower holes 151 are directed obliquely inward, and the normal shower holes 152 are directed obliquely outward. Further, the jet shower holes 17 are arranged in two annular regions, namely, in an inner annular region and an outer annular region. The jet shower holes 17 in the outer annular region include jet shower holes 171 each located at every other position and jet shower holes 172 located at the remaining positions. The jet shower holes 171 are directed obliquely inward, and the jet shower holes 172 are directed obliquely outward. Although FIG. 21 clearly illustrate the differences in orientation between the normal shower holes 151 and 152 and the differences in orientation between the jet shower holes 171 and 172, these differences are difficult to see with the naked eye.

Figure 22:
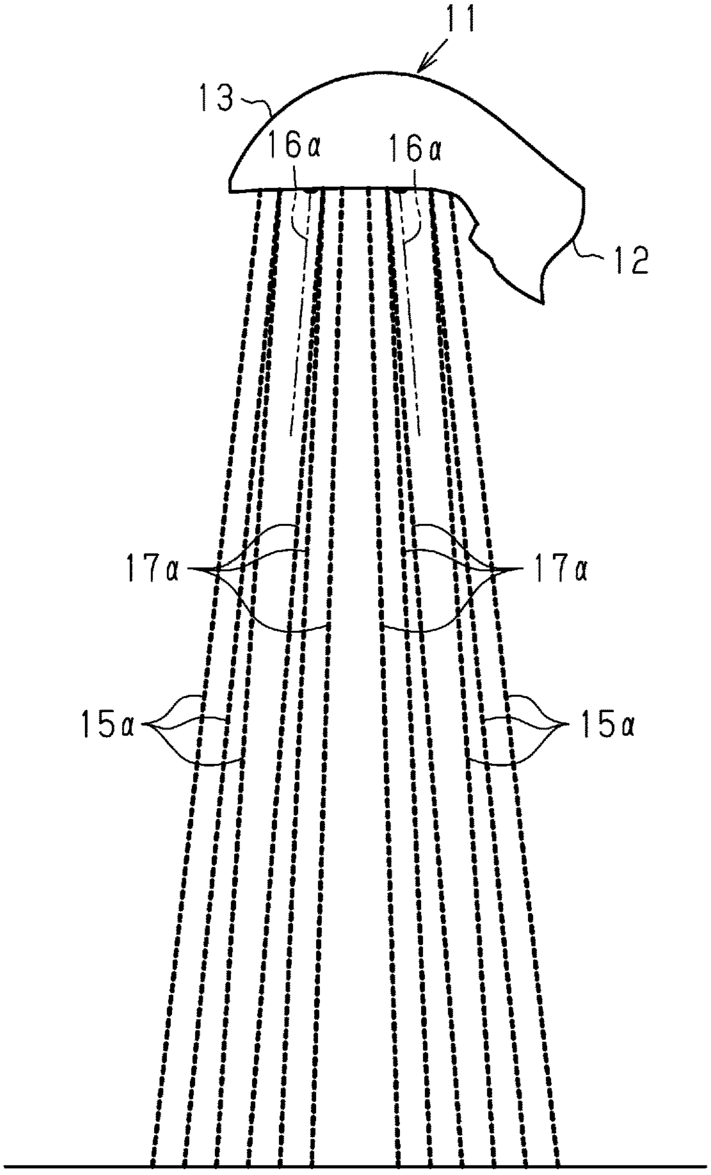
FIG. 22 is a diagram illustrating the state of shower water produced from the shower head of FIG. 21.
Figure 23:
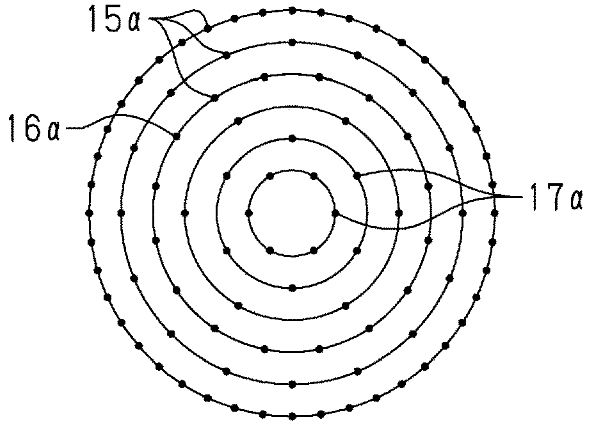
FIG. 23 is a diagram illustrating a diffusion area of the shower water produced from the shower head of FIG. 21.

Accordingly, as shown in FIGS. 22 and 23, normal shower water 15*a* is released toward three outer annular regions. Mist shower water 16*a* is released toward one annular region on the inner side of these annular regions. Jet shower water 17*a* is released toward two annular regions at the central portion. These six annular regions are concentric to each other at substantially equal intervals.

Thus, in the case of using the shower head of the second embodiment in the first shower mode, the density of shower water in contact with skin or hair increases so that water is in plane-to-plane contact with the skin or the hair in the entire region where shower water is released. This softens the shower water and improves the feel in showering. When the number of annular regions for releasing shower water is small, water contacts skin or hair with low density and high pressure. This makes the shower water less soft and reduces the feel of the shower water.

TABLE 1

| Example | 250 mm | 500 mm | 750 mm |
|---|---|---|---|
| Felt variations | 6 | 5 | 4 |
| Did not feel variations | 8 | 9 | 10 |
| Experimental Example | 250 mm | 500 mm | 750 mm |
| Felt variations | 13 | 14 | 14 |
| Did not feel variations | 1 | 0 | 0 |

Table 1 shows the result of releasing shower water in the first shower mode using the shower head 11 of the example and a shower head 11 of an experimental example that were arranged above the upward-facing palms of fourteen subjects, under the same condition of water pressure and water temperature. The shower head 11 of the example had the structure of the second embodiment and released water to the six annular regions as shown in FIGS. 22 and 23. The shower head 11 of the experimental example had the structure of the first embodiment and released water to four annular regions. Water was released to the palms, with the palms spaced apart from the face plate 91 of the shower head 11 of each example by 250 mm, 500 mm, and 750 mm.

A survey was conducted for a case where the subjects did not feel variations in the contact of shower water (i.e., the subjects felt that the shower water was soft) and a case where the subjects felt the variations. As is obvious from Table 1, the result indicated that the shower head 11 of the example provided smaller variations than the experimental example in each distance. For example, in the distance of 250 mm, eight subjects did not feel the variations in the example whereas one subject did not feel the variations in the experimental example. In the distance of 750 mm, ten subjects did not feel the variations in the example whereas zero subject did not feel the variations in the experimental example.

Accordingly, the second embodiment provides the following advantages in addition to the advantages of the first embodiment.

(10) In a case where shower water contacts skin or hair, the shower water provides a soft feel in which the user does not feel variations so much. This allows for comfortable showering. In addition, this effect is achieved by only changing the orientations of the normal shower holes 15 and the jet shower holes 17. This simplifies the structure without increasing the number of components.

(11) As described above, the feel of shower water is improved by only changing the normal shower holes 15 in the inner annular region and the jet shower holes 17 in the outer annular region. This makes the shower head 11 easier to use without increasing the weight or size of the shower head 11.

Figure 24:
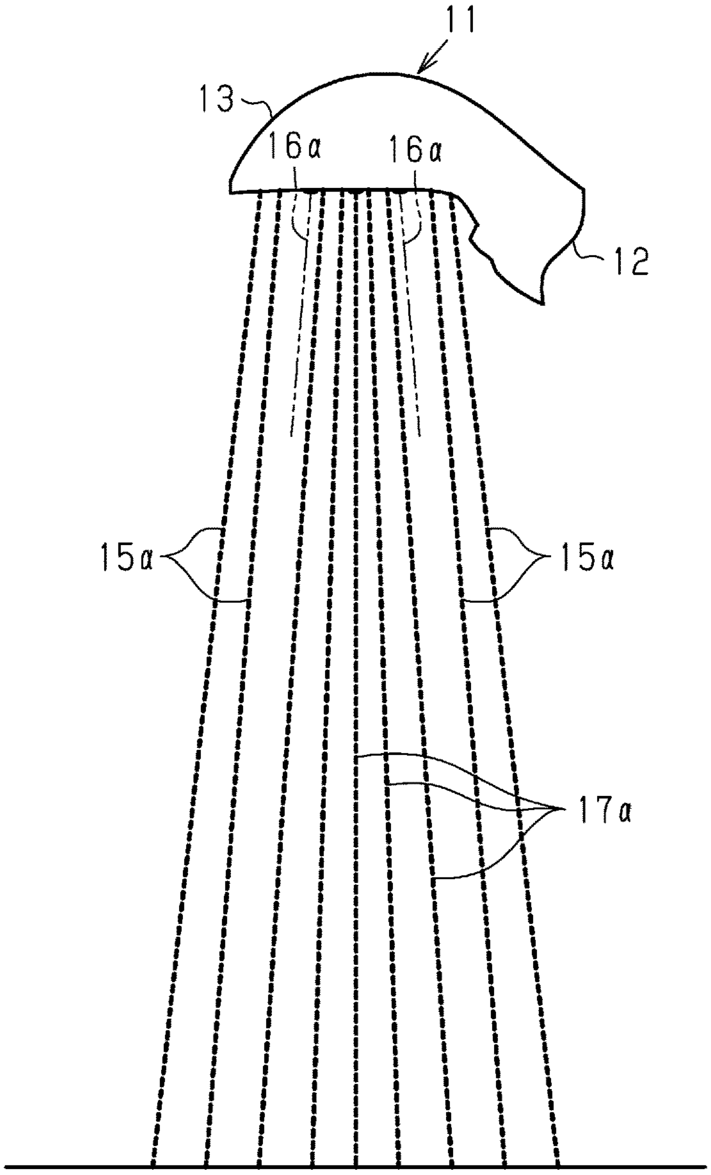
FIG. 24 is a side view showing the second embodiment with another structure.
Figure 25:
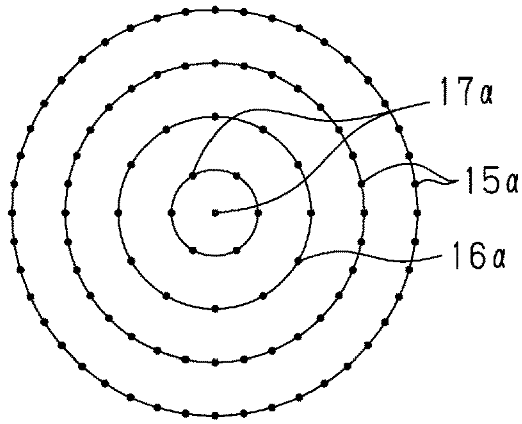
FIG. 25 is a diagram illustrating the shower region in FIG. 24.

Although not shown in the drawings, the jet shower holes 17 are added to the structure shown in FIGS. 24 and 25 at the center of the face plate 91 of the shower head 11. This provides the same advantages as the shower head 11 of the example.

Third Embodiment

Figure 27:
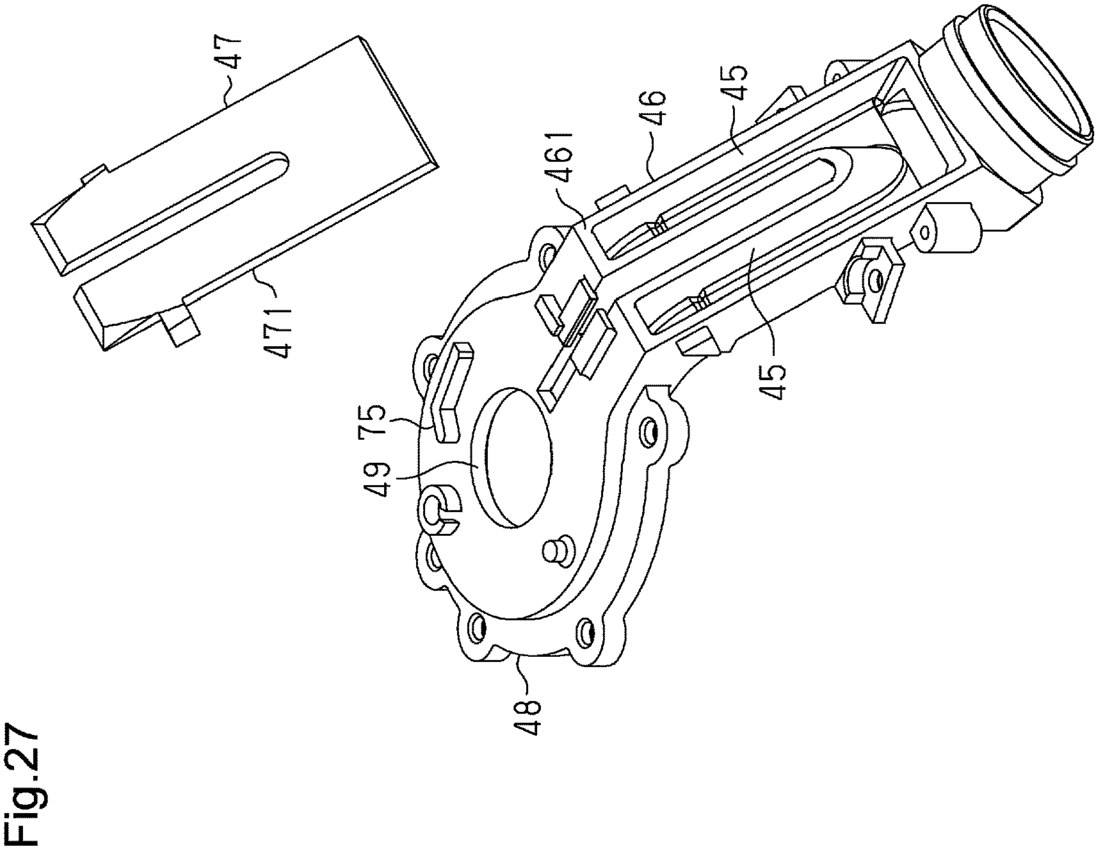
FIG. 27 is an exploded perspective view showing the intermediate passage unit of FIG. 26.
Figure 26:
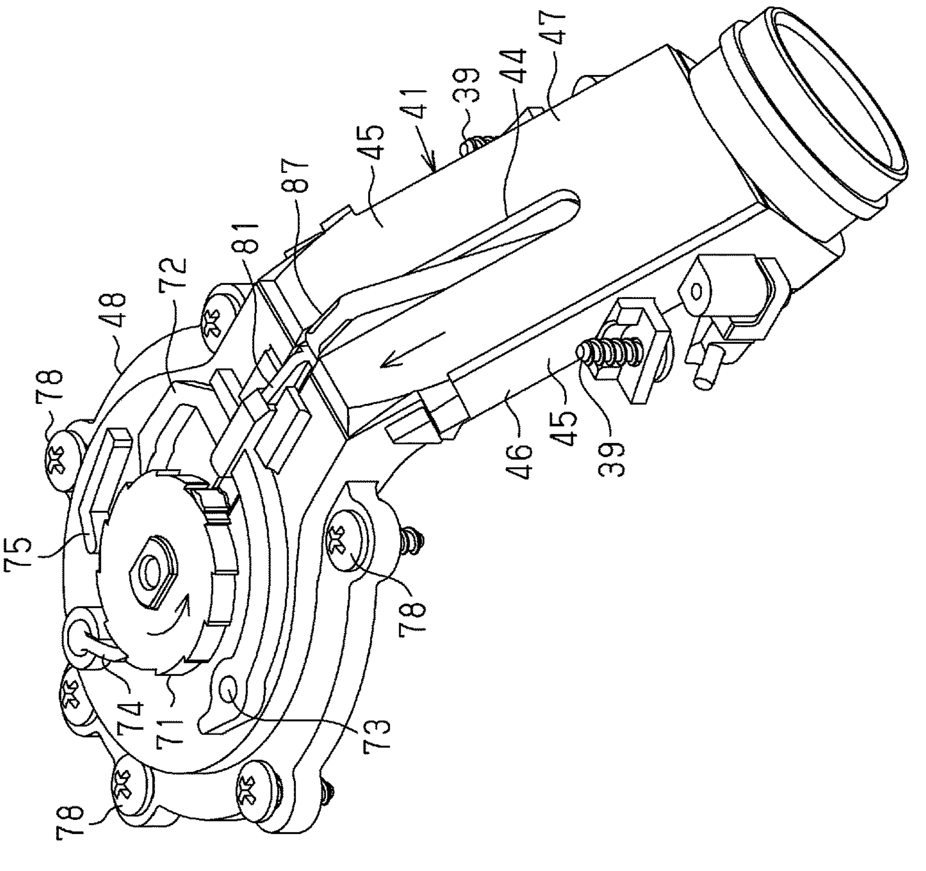
FIG. 26 is a perspective view showing the intermediate passage unit according to a third embodiment.

A third embodiment of the present invention will now be described with reference to FIGS. 26 and 27. The differences from the first embodiment will mainly be described.

In the third embodiment, the upper surface of the intermediate passage body 46, which includes the branched passages 45, and the lid 47 of the intermediate passage unit 41 have a straight shape in a side view, not a curved shape. Further, a joint face 461 of the intermediate passage body 46 and a joint face 471 of the lid 47 are entirely flat, not curved.

Thus, the third embodiment has the following advantage.

(11) The joint face 461 of the intermediate passage body 46 and the joint face 471 of the lid 47 are flat. This allows the intermediate passage body 46 and the lid 47 to be properly welded to each other through vibration that acts in one direction along the flat face, without forming a gap.

Fourth Embodiment

A fourth embodiment of the present invention will now be described with reference to FIGS. 28 to 32.

The fourth embodiment provides accommodation for a tablet in a removable manner. The tablet dissolves, into water, ingredients effective for beauty care or the like.

Figure 28:
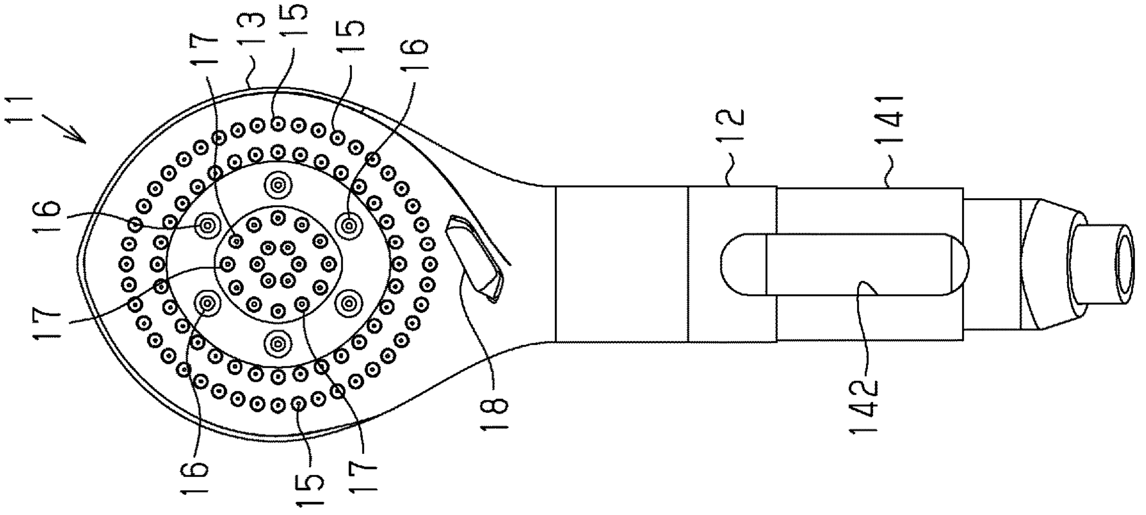
FIG. 28 is a front view showing the shower head according to a fourth embodiment.

The fourth embodiment is different from the first embodiment in the structure of the basal side of the handle 12. That is, as shown in FIGS. 28 and 29, in the fourth embodiment, the basal end of the handle 12 includes a cylindrical member 141 and its front surface includes a window hole 142.

Figure 29:
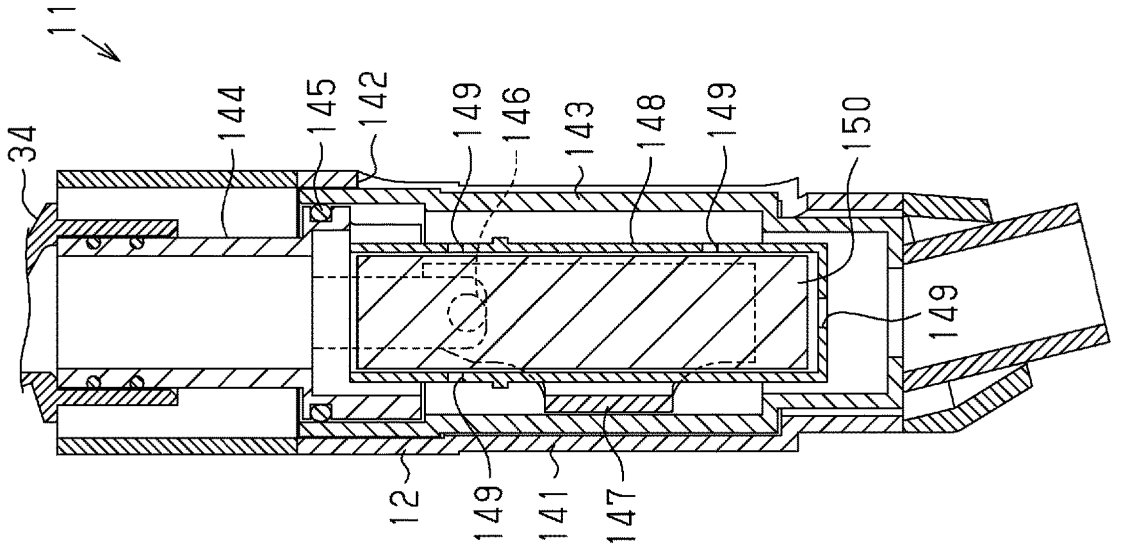
FIG. 29 is a cross-sectional view showing a part of the handle of the shower head of FIG. 28.

As shown in FIG. 29, a cylindrical lower water passage member 143, which is made of a transparent material, is fixed in the cylindrical member 141. A joint 144 is connected to the downstream side of the bubble generating member 34 (upstream bubble generator). The joint 144 is inserted and connected to an upstream opening of the lower water passage member 143 by a seal ring 145 in a removable manner.

Figure 31:
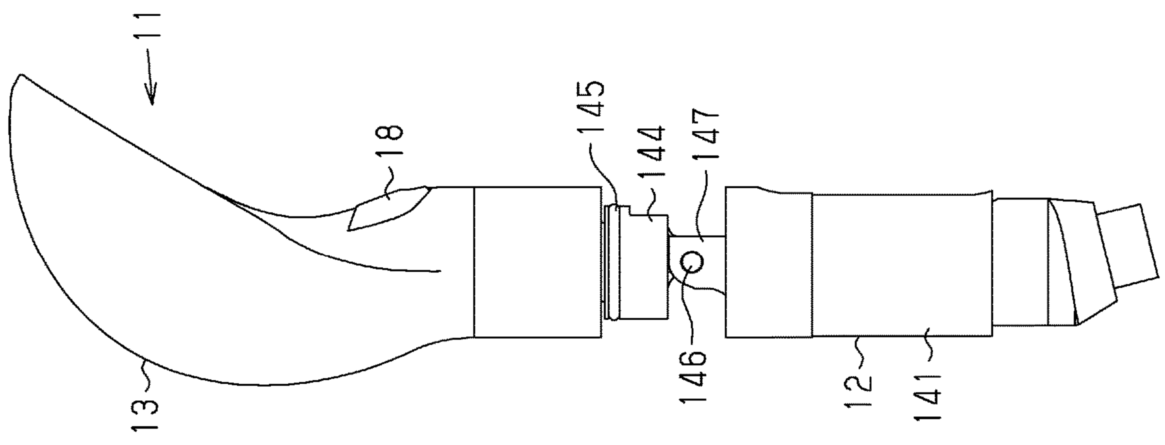
FIG. 31 is a side view showing the shower head of FIG. 28 with the head portion drawn out.
Figure 32:
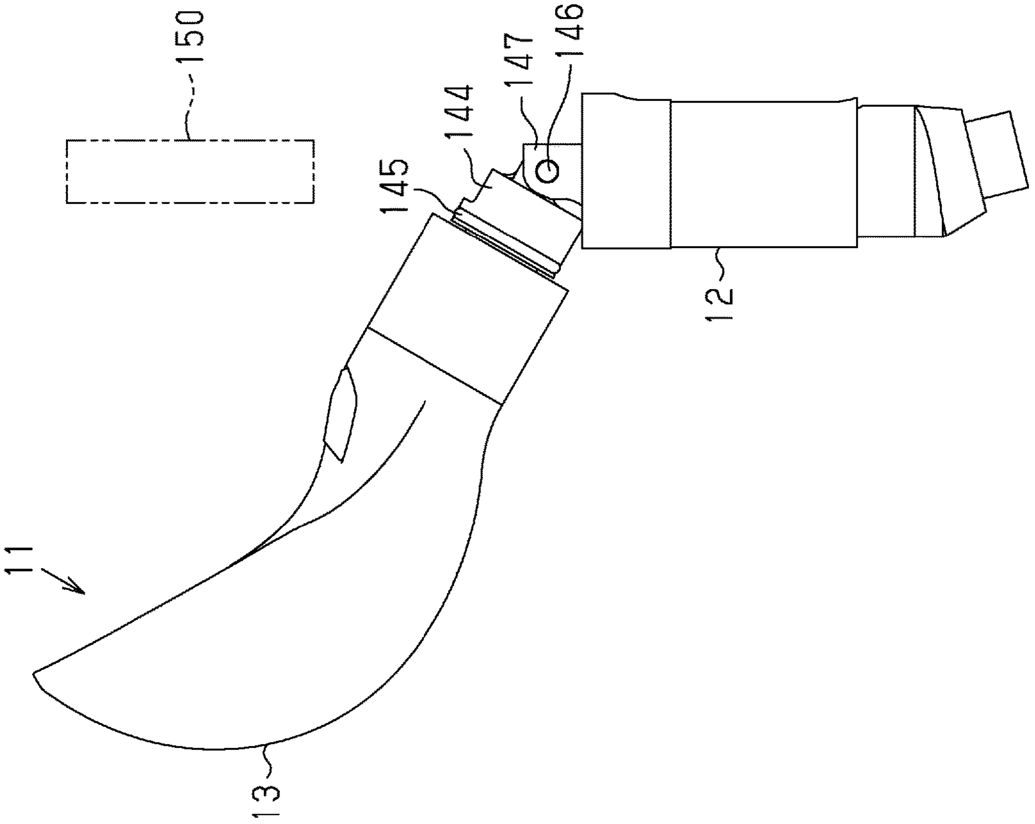
FIG. 32 is a side view showing the fallen head portion.

As shown in FIGS. 29, 31, and 32, a holding member 147 is pivotally supported by the lower end of the joint 144 about a shaft 146. The holding member 147 is located away from the window hole 142 so as not to hinder a field of view in the window hole 142. The holding member 147 supports a tubular transparent holder 148. The upper end of the holder 148 opens, and the circumferential wall of the holder 148 includes through-holes 149. The holder 148 accommodates a tablet 150.

In the fourth embodiment, the tablet 150 dissolves carbon dioxide into water. When the shower head 11 is used, water passes through the lower water passage member 143. This causes carbon dioxide to dissolve into the water through the through-holes 149 of the holder 148.

Figure 30:
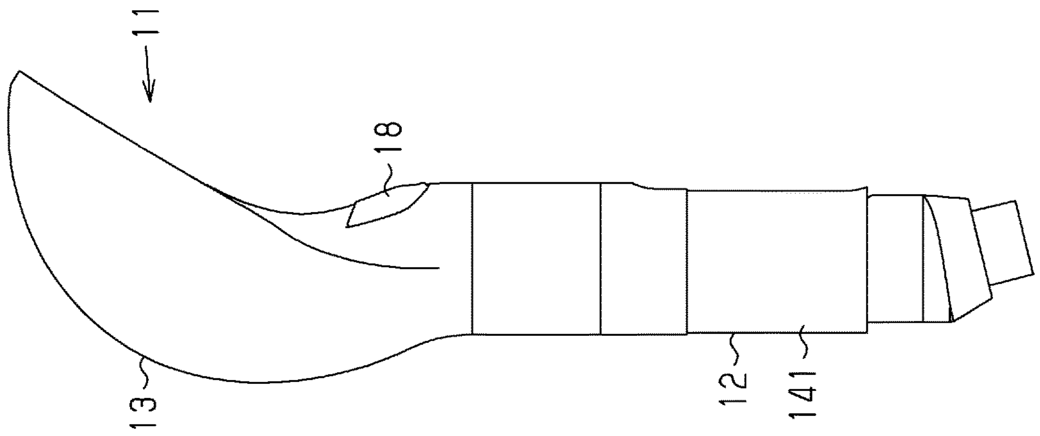
FIG. 30 is a side view showing the shower head of FIG. 28.

As the carbon dioxide dissolves, the tablet 150 gradually becomes smaller. The degree of the reduction is visually recognizable through the window hole 142. In a case where a new tablet 150 needs to be added, as shown in FIGS. 30 and 31, the opening of the upper end of the holder 148 is exposed to the outside by removing the joint 144 from the cylindrical member 141. In this state, as shown in FIG. 32, the opening of the upper end of the holder 148 is opened upward by bringing down the head portion 13 with respect to the shaft 146. This allows a new tablet 150 to be inserted into the holder 148. Then, the head portion 13 simply needs to be returned to the state shown in FIGS. 28 and 30.

The fourth embodiment has the following advantage.

(12) The use of carbon dioxide allows for showering and bathing in a bathtub effective for beauty care. Further, a new tablet 150 can be easily added when necessary.

Modifications

The above-described embodiments may be modified as follows. The above-described embodiments and the following modifications can be combined as long as the combined modifications remain technically consistent with each other.

In the present invention, the shower head does not have to include the handle. Examples of such a shower head include a shower head in which its head portion is fixed to the distal end of a water supply pipe fixed to a wall surface or a ceiling surface and a shower head in which its head portion can be held. In these structures, the head portion includes minute bubble generators.

The selectable shower mode may be changed by, for example, changing the configurations of the partition walls 121 of the first member 102 or changing the arrangement of the selection holes 106. That is, the first to third embodiments allow the user to select the first shower mode of simultaneously releasing normal shower water and jet shower water, the second shower mode of releasing only jet shower water, the third shower mode of releasing only mist shower water, and the fourth shower mode of simultaneously releasing normal shower water and mist shower water. In addition to these modes, the user may select a mode of, for example, simultaneously releasing shower water from the normal shower holes 15 located in one of the inner and outer regions and from the jet shower holes 17. This structure reduces the number of the normal shower holes 15, from which shower water is released, and thus increases the pressure of the shower water from the normal shower holes 15. Alternatively, the user may select a mode of releasing only normal shower water from the normal shower holes 15 located in the inner and outer annular regions. This structure also increases the pressure of the shower water from the normal shower holes 15.

In the present invention, the shower head does not have to include a function of switching the type of shower water (e.g., normal shower water or jet shower water). That is, in the present invention, the shower head may include only a function of releasing normal shower water or mist shower water.

The upstream bubble generator may be located in the intermediate passage unit 41. In this case, the bubble generating passages 35 are arranged in parallel along the width direction of the intermediate passage unit 41.

In the structure in which the constrictions 37 and the tapered portions 38 are used to generate minute bubbles, the constrictions 37 and the tapered portions 38 may each have an oval or elliptic cross-sectional shape or may each have a quadrilateral or rectangular cross-sectional shape.

The upstream bubble generator and the downstream bubble generator may both have a straight passage mode with constrictions or may both have a swirling flow mode.

The mode for generating minute bubbles may be changed to a shear generating mode in which minute bubbles are generated when the high-speed flow of water contacts a corner edge or a blade-shaped edge.

The mode for generating minute bubbles may be changed to a pore generating mode in which minute bubbles are generated when the flow of water passes through a large number of porous regions (e.g., slit filters). The slit filters may be made of, for example, porous ceramic.

The arrangement of the normal shower holes 15, the mist shower holes 16, and the jet shower holes 17 in the inner and outer regions may be changed. For example, the mist shower holes 16 may be located at the central portion and the jet shower holes 17 may be located on the outer circumferential side.

In the second embodiment, the normal shower holes 15 and the jet shower holes 17 may be oriented in three or more directions. This structure increases the number of annular regions defined by releasing shower water and further softens the contact of the shower water on skin.

The normal shower holes 15 on the outer circumferential side and the jet shower holes 17 on the inner circumferential side may be oriented in different directions in which shower water is released. This structure increases the number of annular regions defined by releasing shower water and further softens the contact of the shower water.

In each of the above-described embodiments, the minute bubble generators are located in two sections, namely, the upstream and downstream sides. Instead, the minute bubble generators may be located in three or more sections.

The tablet 150 of the fourth embodiment may be a tablet of a type in which a scent, a cosmetic material, or a chemical agent is dissolved or mixed in water. By mixing a chemical agent or cosmetic material in mist shower water, the chemical agent or cosmetic material becomes highly permeable to skin.

In the fourth embodiment, instead of the tablet 150, a cartridge accommodating a carbon dioxide generating tablet, a scent liquid, or the like may be accommodated in a replaceable manner. In this structure, a case for the cartridge includes an opening into and out of which water is released.

The position of the switch button 18, which is used to switch the type of shower (e.g., normal shower or mist shower) may be changed. The switch button 18 may be located on the side surface of the head portion 13, the side surface of the handle 12, or the rear surface of the head portion 13.

In the structure including bubble generators of the straight passage mode with constrictions or bubble generators of the swirling flow mode, a mechanism may be employed to adjust the number of bubble generators through which water passes in correspondence with the level of water pressure.

REFERENCE SIGNS LIST

11) Shower Head; 12) Handle; 13) Head Portion; 14) Upstream Passage Unit; 15) Normal Shower Hole; 16) Mist Shower Hole; 17) Jet Shower Hole; 12) Handle; 13) Head Portion; 34) Bubble Generating Member; 37) Constriction; 38) Tapered Portion; 41) Intermediate Passage Unit; 100) Water Distribution Unit; 135) Swirling Flow Generating Member

The invention claimed is:

1. A shower head, comprising a head portion that includes shower holes, wherein minute bubble generators are disposed at positions on an upstream side and a downstream side in a water passage, wherein the shower holes include a mist shower hole configured to release a mist shower, the water passage includes an accommodation recess, the mist shower hole extending through a bottom of the accommodation recess, the accommodation recess accommodates a swirling flow generating member, the swirling flow generating member has an opening at an end closer to the mist shower hole, drawing grooves are disposed on an outer circumference of the swirling flow generating member an end of each of the drawing grooves includes a guide opening, the guide opening being connected to an internal space of the swirling flow generating member, and the minute bubble generator on the downstream side includes the accommodation recess and the swirling flow generating member.

2. The shower head according to claim 1, comprising a handle held by a user, wherein the head portion is located proximate to a distal end of the handle.

3. The shower head according to claim 2, wherein the minute bubble generator on an upstream side of water is located in the handle, and the minute bubble generator on a downstream side of the water is located in the head portion.

4. The shower head according to claim 3, wherein the minute bubble generator on the upstream side has a straight passage mode with a constriction so as to utilize a Venturi effect, and the minute bubble generator on the downstream side has a swirling flow mode.

5. The shower head according to claim 3, wherein the minute bubble generator on the upstream side includes a passage of a straight passage mode, the passage including constrictions.

6. The shower head according to claim 3, wherein the minute bubble generator on the downstream side includes passages of a swirling flow mode.

7. A shower head, comprising a head portion that includes shower holes, wherein minute bubble generators are disposed at positions on an upstream side and a downstream side in a water passage, a bifurcated portion is disposed at a part of the water passage, and a shower switch mechanism is disposed in a narrow section of the bifurcated portion.

8. The shower head according to claim 7, wherein the minute bubble generator is disposed on each of an upstream side and a downstream side of the bifurcated portion.

9. The shower head according to claim 8, wherein a switch button of the switch mechanism on a front surface of the head portion is shifted from a central position in a left-right direction.

* * * * *